(12) United States Patent
Nakase

(10) Patent No.: US 8,416,321 B2
(45) Date of Patent: Apr. 9, 2013

(54) FOLDER CREATION IMAGE PROCESSING APPARATUS AND RELATED CONTROL METHOD FOR RECORDING AN IMAGE

(75) Inventor: Yuichi Nakase, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 12/883,097

(22) Filed: Sep. 15, 2010

(65) Prior Publication Data

US 2011/0004836 A1    Jan. 6, 2011

Related U.S. Application Data

(63) Continuation of application No. 11/482,497, filed on Jul. 7, 2006, now Pat. No. 7,821,549.

(30) Foreign Application Priority Data

Jul. 13, 2005    (JP) ................. 2005-204740

(51) Int. Cl.
| | |
|---|---|
| H04N 5/76 | (2006.01) |
| H04N 5/225 | (2006.01) |
| H04N 5/262 | (2006.01) |
| G02B 15/14 | (2006.01) |
| G03B 17/00 | (2006.01) |

(52) U.S. Cl. ............... 348/231.5; 348/374; 348/335; 348/240.99; 348/207.99; 359/696; 396/55

(58) Field of Classification Search .......... 348/231.2, 348/231.5; 359/696–700; 396/55
See application file for complete search history.

(56) References Cited

U.S. PATENT DOCUMENTS

2004/0119837 A1*   6/2004   Inoue ................ 348/207.99

FOREIGN PATENT DOCUMENTS

| JP | 2001-054041 A | 2/2001 |
|---|---|---|
| JP | 2001054041 | * 2/2001 |

OTHER PUBLICATIONS

Kodak Professional DCS ProSLR/c Digital Camera User's Guide, Apr. 28, 2004.*

* cited by examiner

*Primary Examiner* — Roberto Velez
*Assistant Examiner* — Joel Fosselman
(74) *Attorney, Agent, or Firm* — Canon USA, Inc., IP Division

(57) ABSTRACT

An image processing apparatus captures an image in a shooting operation and records an image file in a folder of a recording medium. A user interface enables a user to set the units of date/time for automatically creating a new folder that can store image files. A first storage unit stores the units of date/time being set by the user through the user interface. A folder creation unit creates a new folder in the recording medium by the units of date/time stored in the first storage unit. And, a recording unit records the image file obtained by the shooting operation in the new folder created by the folder creation unit.

16 Claims, 24 Drawing Sheets

FOLDER CREATION IMAGE PROCESSING APPARATUS AND RELATED CONTROL METHOD FOR RECORDING AN IMAGE

CROSS REFERENCE TO RELATED APPLICATIONS

The present application is a continuation of U.S. patent application Ser. No. 11/482,497, filed on Jul. 7, 2006, entitled "IMAGE PROCESSING APPARATUS AND RELATED CONTROL METHOD", which claims priority from Japanese Patent Application No. 2005-204740, filed Jul. 13, 2005, both of which are hereby incorporated by reference herein in their entirety.

BACKGROUND OF THE INVENTION

1. Field of the Invention

The present invention relates to an image processing apparatus that can capture and record still images and/or movies, and also relates to a related control method.

2. Description of the Related Art

Digital cameras and digital video cameras, i.e., representative image processing apparatuses now widely used, can capture still images and movies with an image capturing element (such as a CCD sensor or a CMOS sensor) and can record each captured image as a digital data file (i.e., a captured image file).

The file system (i.e., a folder structure) consisting of folders (directories) is generally used to record captured image files. The folders enable a user to sort the captured image files in such a manner that each image file can be easily retrieved later.

For example, as discussed in Japanese Patent Application Laid-open No. 2001-54041, an image capturing apparatus can store captured images into a folder having a creation date identical to the shooting date of the captured image and can create a new folder if such a folder is unavailable.

However, according to the image capturing apparatus disclosed in the above-described Japanese Patent Application Laid-open No. 2001-54041, the captured images are only allowed to be sorted according to the day the image was captured. Therefore, the grouping conditions of the captured image files are substantially fixed to the units of day and cannot be changed later. For example, the grouping conditions cannot be changed in units of week or month or the like.

SUMMARY OF THE INVENTION

The present invention is directed to an image processing apparatus that can create a new folder for recording captured image files and can realize a simplified sorting of the captured image files. Another aspect of the present invention is to provide an image processing apparatus that enables a user to flexibly set or change the creating conditions of a new folder.

According to an aspect of the present invention, an image processing apparatus is provided which configured to capture an image by a shooting operation and record an image file in a folder of a recording medium. Here, the apparatus includes a user interface configured to allow a user to set the units of date/time for creating a new folder for storing image files; a first storage unit configured to store the units of date/time set by the user; a folder creation unit configured to create a new folder in the recording medium by the units of date/time stored in the first storage unit; and a recording unit configured to record the image file obtained by the shooting operation in the new folder.

According to an aspect of the present invention, the image processing apparatus may further includes a setting unit configured to allow the user to set a forced creation instruction of a new folder, wherein the folder creation unit creates a new folder in the next shooting operation when the forced creation instruction is set. According to yet another aspect of the present invention, the setting unit may be the user interface. In another aspect of the present invention, the setting unit may be a button or switch dedicated for the forced creation instruction.

According to yet another aspect of the present invention, the user interface allows the user to select, as the units of date/time including at least one of hour/minute, day, week, month, and year. And furthermore, according to another aspect of the present invention, the user interface allows the user to set an offset time for determining a standard time for determining a change in a value of the units of date/time. Moreover, according to another aspect of the present invention, the image processing apparatus may further include a second storage unit configured to store a date/time of a final shooting operation.

Additionally, according to an aspect of the present invention, the folder creation unit decides the necessity of creating a new folder, based on either the date/time stored in the second storage unit or a shooting date/time of a finally captured image file stored in the recording medium, as well as based on a present date/time. Moreover, according to another aspect of the present invention, at least one of the date/time stored in the second storage unit and a shooting date/time of a finally captured image file stored in the recording medium is updated in response to replacement of recording media or in a shooting operation.

According to an aspect of the present invention, a method for controlling an image processing apparatus configured to capture an image by a shooting operation and record an image file in a folder of a recording medium is provided. Here, the method includes displaying a user interface configured to let a user to set the units of date/time for creating a new folder that can store image files; storing the units of date/time set by the user; creating a new folder in the recording medium having the units of the stored date/time; and recording the image file obtained by the shooting operation in the new folder.

And, according to still yet another aspect of the present invention, a computer readable medium is provided containing computer-executable instructions for controlling an image processing apparatus configured to capture an image by a shooting operation and record an image file in a folder. The medium includes computer-executable instructions for displaying a user interface configured to allow a user to set the units of date/time for creating a new folder that can store image files; computer-executable instructions for storing the units of date/time being set by the user; computer-executable instructions for creating a new folder by the store units of date/time; and computer-executable instructions for recording the image file obtained by the shooting operation in the new folder.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EXEMPLARY EMBODIMENTS

Figure 1:
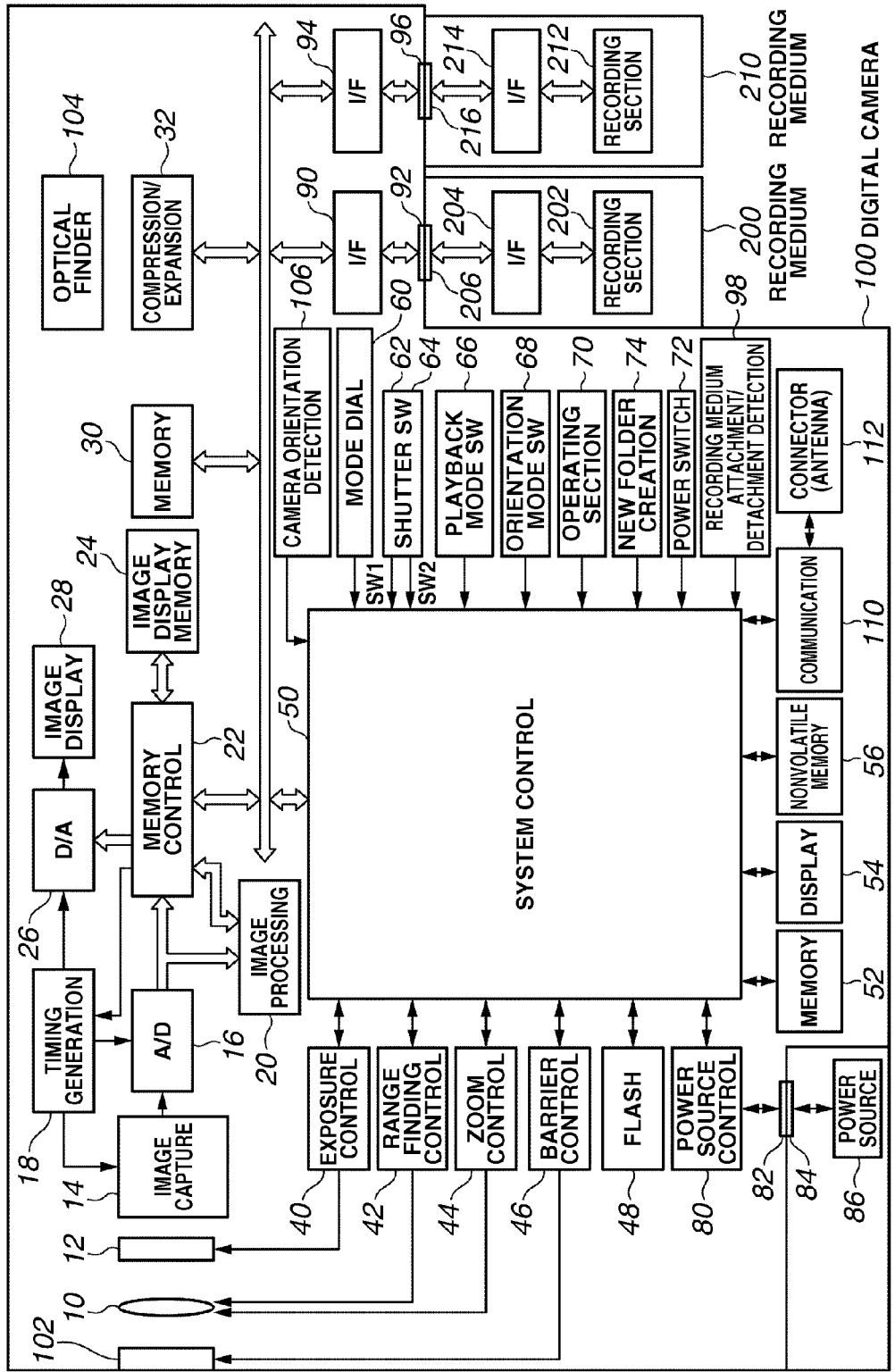
FIG. 1 is a block diagram illustrating an arrangement of a digital camera, functioning as an image processing apparatus, in accordance with an exemplary embodiment of the present invention.

The following description of exemplary embodiments is merely illustrative in nature and is in no way intended to limit the invention, its application, or uses.

It is noted that throughout the specification, similar reference numerals and letters refer to similar items in the following figures, and thus once an item is defined in one figure, it may not be discussed for following figures.

Exemplary embodiments of the present invention will now be described in detail in accordance with the accompanying drawings.

First Exemplary Embodiment

FIG. 1 is a block diagram illustrating an arrangement of a digital camera, functioning as an image processing apparatus, in accordance with an exemplary embodiment of the present invention. A digital camera 100 includes an imaging lens 10, a shutter 12 having a diaphragm function, an image capturing element 14 (e.g., CCD or CMOS sensor) that can convert an optical image into an electric signal, and an A/D converter 16 that can convert an analog signal of the image capturing element 14 into a digital signal.

A timing generation circuit 18 can supply a clock signal or a control signal to the image capturing element 14, the A/D converter 16, and a D/A converter 26. A memory control circuit 22 and a system control circuit 50 can control the timing generation circuit 18.

An image processing circuit 20 can apply predetermined pixel interpolation processing and color conversion processing to the data supplied from the A/D converter 16 or to the data supplied from the memory control circuit 22.

Furthermore, the image processing circuit 20 can perform predetermined calculation processing based on captured image data. The system control circuit 50 can perform, based on obtained calculation result, TTL (through the lens)-type AF (auto focus) processing, AE (auto exposure) processing, and EF (pre-flash emission) processing applied to an exposure control section 40 and a range-finding control section 42.

Also, the image processing circuit 20 can perform predetermined calculation processing based on captured image data, and can perform TTL-type AWB (auto-white balance) processing based on obtained calculation result. The memory control circuit 22 can control the A/D converter 16, the timing generation circuit 18, the image processing circuit 20, an image display memory 24, the D/A converter 26, a memory 30, and a compression/expansion circuit 32. The output data of A/D converter 16 is written, via the image processing circuit 20 and the memory control circuit 22, or via only the memory control circuit 22, into the image display memory 24 or the memory 30.

The image data stored in the image display memory 24 can be supplied, via the D/A converter 26, to an image display section 28 (e.g., LCD or organic EL display) that can display an image based on the input image data. The image display section 28 functions as an electronic viewfinder (EVF) that can successively display captured image data (through images). The image display section 28 can arbitrarily turn the display on or off in response to an instruction given from the system control circuit 50. When image display section 28 is in an OFF state, the digital camera 100 can reduce electric power consumption.

Furthermore, the image display section 28 can display an operation state and a message with images and letters in accordance with the operation of the system control circuit 50 that can execute the program(s). The memory 30 is a storage device that can store captured still images and movies, with a sufficient storage capacity for a predetermined number of still images and a predetermined time of movies. In other words, a user can shoot continuous still images or can shoot panoramic images, because large-sized image data can be written into the memory 30 at higher rates.

Furthermore, the memory 30 can be used as a work area of the system control circuit 50. The compression/expansion circuit 32 can read an image from the memory 30, and perform conventionally well-known data compression and/or expansion processing using an adaptive discrete cosine transformation (ADCT) or a wavelet transformation applied to the readout image. The processed image data are written into the memory 30. The exposure control section 40 can control the shutter 12 having a diaphragm function, and can adjust, in cooperation with the flash 48, the flash light.

The range-finding control section 42 can control focusing of the imaging lens 10. The zoom control section 44 can control zooming of the imaging lens 10. A barrier control section 46 can control an operation of a lens barrier (i.e., protector) 102 having a function of protecting the imaging lens 10. The flash 48 has a function of emitting auxiliary light for a shooting operation, in addition to a light adjusting function. Furthermore, the flash 48 can emit auxiliary light for AF.

The system control circuit 50 can perform a TTL-type control applied to the exposure control section 40 and the range-finding control section 42, based on calculation results obtained by the image processing circuit 20 that can process captured image data. The system control circuit 50 is, for example, a CPU that can execute the program (s) stored in a memory 52 to control the operation of the digital camera 100. The memory 52 can store constants, variables, and program (s) used in the operation of the system control circuit 50.

A display section 54 is, for example, a combined output device (including LCD, LED, and speaker) which can display letters, images, or output voice messages representing various operation states of the system control circuit 50 that executes the program(s). The display section 54, having a single or plural display screens, can be provided at an appropriate position near an operating section 70 of the digital camera 100 so that a user can easily view the screen(s). An optical finder 104 can include part of the display section 54.

The display contents of the display section 54 include, for example, a single shot/continuous shot indication, a self-timer indication, a compression rate indication, a recording pixel number indication, a recorded image number indication, a residual shot number indication, a shutter speed indication, a diaphragm value indication, an exposure correction indication, a flash indication, a red-eye reduction indication, a macro shooting indication, a buzzer setup indication, a state-of-residual clock battery indication, a state-of-residual battery capacity indication, an error indication, a plural digits information indication, a state-of-attached/detached recording media (200 and 210) indication, a state-of-attached/detached lens unit indication, a communication I/F operation indication, a date/time indication, a state-of-connected external computer indication, an in-focus indication, a shooting standby indication, a camera-shake warning indication, a state-of-flash charge indication, a recording medium writing operation indication. Part of the display contents of the display section 54 can be displayed in the optical finder 104, as described later.

Furthermore, of the display contents of the display section 54, the LED can display the in-focus indication, the shooting standby indication, the camera-shake warning indication, the state-of-flash charge indication, a flash charge completion indication, the recording medium writing operation indication, a macro shooting setup informing indication, and a state-of-secondary battery charge indication. Moreover, a lamp can be used to inform self-timer information. In this case, the self-timer informing lamp can be commonly used as a light source for the AF auxiliary light.

A nonvolatile memory 56 is an electrically erasable and programmable memory, such as EEPROM. A mode dial 60, shutter switches 62 and 64, a playback mode switch 66, an orientation mode switch 68, and an operating section 70 constitute an operating unit that enables a user to input various operation instructions into the system control circuit 50. The operating unit can include a single or plural buttons, switches, dials, touch panels, a visually recognizable pointer, and a voice recognition apparatus.

More specifically, the mode dial 60 can enable a user to set an automatic shooting mode, a program shooting mode, a shutter speed-priority shooting mode, a diaphragm-priority shooting mode, a manual shooting mode, a focus depth-priority shooting mode, a portrait shooting mode, a landscape shooting mode, a close-up shooting mode, a sports shooting mode, a night shooting mode, and a panorama shooting mode.

A first shutter switch SW1 (62) is turned on when a shutter button (not shown) provided on the digital camera 100 is operated halfway (i.e., in a half pressed state), to instruct initiation of the AF (auto-focus) processing, AE (auto exposure) processing, AWB (auto-white balance) processing, and EF (pre-flash emission) processing.

A second shutter switch SW2 (64) is turned on when the shutter button (not shown) is completely operated (i.e., in a fully pressed state), to instruct initiation of a series of processing including: exposure processing for writing a signal of the image capturing element 12 into the memory 30, as image data, via the A/D converter 16 and the memory control circuit 22; developing processing performed based calculations obtained by the image processing circuit 20 and the memory control circuit 22; and recording processing for reading the image data from the memory 30, compressing the readout image data by the compression/expansion circuit 32, and writing the compressed image data into the recording medium 200 or 210.

The playback mode switch 66 enables a user to set a playback mode, a multi-screen playback/erasure mode, and a PC connection mode. The orientation mode switch 68 enables a user to set ON/OFF of an orientation mode. When the orientation mode is set, an orientation of the digital camera 100 is detected by a camera orientation detecting section 106 during a shooting operation and recorded in a recording medium as auxiliary information (image orientation flag) of a captured image file so that the recorded information can be utilized in a playback mode.

More specifically, the system control circuit 50 can refer to the image orientation flag in a playback mode so that an image captured in a portrait position can be automatically displayed as a portrait image and an image captured in a landscape position can be automatically displayed as a landscape image.

The operating section 70 can include various buttons and touch panels, such as a menu button, a set button, a macro button, a multi-screen playback/page renewal button, a flash setting button, a single shot/continuous shot/self-timer switching button, a menu shift +(plus) button, a menu shift −(minus) button, a playback image shift +(plus) button, a playback image −(minus) button, a shooting quality selection button, an exposure correction button, a date/time setting button, a function selecting/switching button, a function decision/execution button, an image display ON/OFF switch for the image display section 28, a quick view ON/OFF switch for setting a quick view function enabling a user to automatically playback captured image data immediately after accomplishing a shooting operation, and a compression mode switch for selecting a compression rate in the JPEG (Joint Photographic Expert Group) compression or for selecting a CCDRAW mode to directly digitize an output signal of the image capturing element and record the digitized data into a recording medium.

In the present exemplary embodiment, the JPEG compression mode can be selected between a normal mode and a fine mode. A user of the digital camera 100 can set the normal mode in a situation that a data size of a captured image should be first considered, or can set the fine mode in a situation that a quality of the captured image should be first considered.

In the JPEG compression mode, the compression/expansion circuit 32 reads image data from the memory 30, compresses the readout image data at the selected compression rate, and records the compressed image data into, for example, the recording medium 200.

In the RAW mode, image data are directly read out for each line in accordance with a pixel alignment of a color filter for the image capturing element 14. The image data written into the memory 30 via the A/D converter 16 and the memory control circuit 22 are read out and recorded into the recording medium 200. A power source switch 72 enables a user to select either a power ON or a power OFF.

A new folder creation request button 74 enables a user to create a new folder for the next shooting operation in the recording medium 200 or 210, and record captured image files into the newly created folder.

A power source control section 80 includes a battery detection circuit, a DC-DC converter, and a switch circuit for selecting a block to which electric power is supplied. The power source control section 80 can detect the presence of any attached battery, the type of the attached battery, and a state-of-residual battery capacity. Furthermore, the power source control section 80 can control the DC-DC converter based on detection results and an instruction given from the system control circuit 50, so that a required amount of voltage can be supplied to each section including a recording medium for a required period of time.

A power source 86 is a primary battery such as an alkali battery or a lithium battery, or a secondary battery such as a NiCd battery, a NiMH battery, or a Li battery, or can be an AC adapter. The power source 86 is connected via connectors 82 and 84 to the digital camera 100.

The recording medium 200, such as a memory card or a hard disk, includes a recording section 202 (constituted by a semiconductor memory or a magnetic disk), an interface 204 and a connector 206 via which the recording section 202 can be connected to the digital camera 100. Similarly, the recording medium 200 includes a recording section 212, an interface 214 and a connector 216.

The digital camera 100 has connectors 92 and 96 connectable with the connectors 206 and 216 of the recording media 200 and 210, and interfaces 90 and 94 connected to the connectors 92 and 96. A recording medium attachment/detachment detecting section 98 can detect attachment/detachment of the recording media 200 and 210.

In the present exemplary embodiment, the digital camera 100 has an independent set of the interface and the connector for each of two recording media connectable to the digital camera 100. However, the present exemplary embodiment can use a single or any other arbitrary sets of interfaces and connectors for connecting a required number of recording media to the digital camera 100.

Furthermore, the present exemplary embodiment can differentiate a combination of the interface and the connector for each recording medium. For example, the interfaces and connectors can operate in conformity with the standards applied to a PCMCIA card or a CF (compact flash (registered trademark)) card.

Furthermore, the interfaces 90 and 94 and the connectors 92 and 96 can operate in conformity with the standards of a PCMCIA card, so that the digital camera 100 can transfer image data or management information attached to the image data to a peripheral device such as other computer or a printer via various communication cards such as a LAN card, a modem card, a USB card, an IEEE1394 card, a P1284 card, an SCSI card, and a PHS card. The barrier 102, covering the lens 10 of the digital camera 100, can prevent the image capturing section from being spoiled or damaged.

The optical finder 104 is, for example, a TTL finder that can form an image of light flux passing through the lens 10 with a prism or a mirror. The optical finder 104 enables a user to perform shooting without using the electronic finder function of the image display section 28.

Furthermore, as described above, the optical finder 104 can display the information supplied from the display section 54, such as the in-focus indication, the shooting standby indication, the camera-shake warning indication, the state-of-flash charge indication, the flash charge completion indication, the shutter speed indication, the diaphragm value indication, the exposure correction indication, and the recording medium writing operation indication.

The camera orientation detecting section 106, for example, includes an ON/OFF switch that turns on or off in accordance with the orientation of the camera, and can detect the oriented state of the digital camera 100. In this case, the oriented state of the digital camera 100 represents the condition of the digital camera 100 corresponding to a landscape shooting mode or a portrait shooting mode.

A communication section 110 can perform various processing for RS232C, USB, IEEE1394, P1284, SCSI, modem, LAN, and wireless communications. A connector (or an antenna in the case of wireless communications) 112 can realize a connection between the digital camera 100 and other device via the communication section 110.

[Exemplary Operation of Digital Camera]

Figure 2:
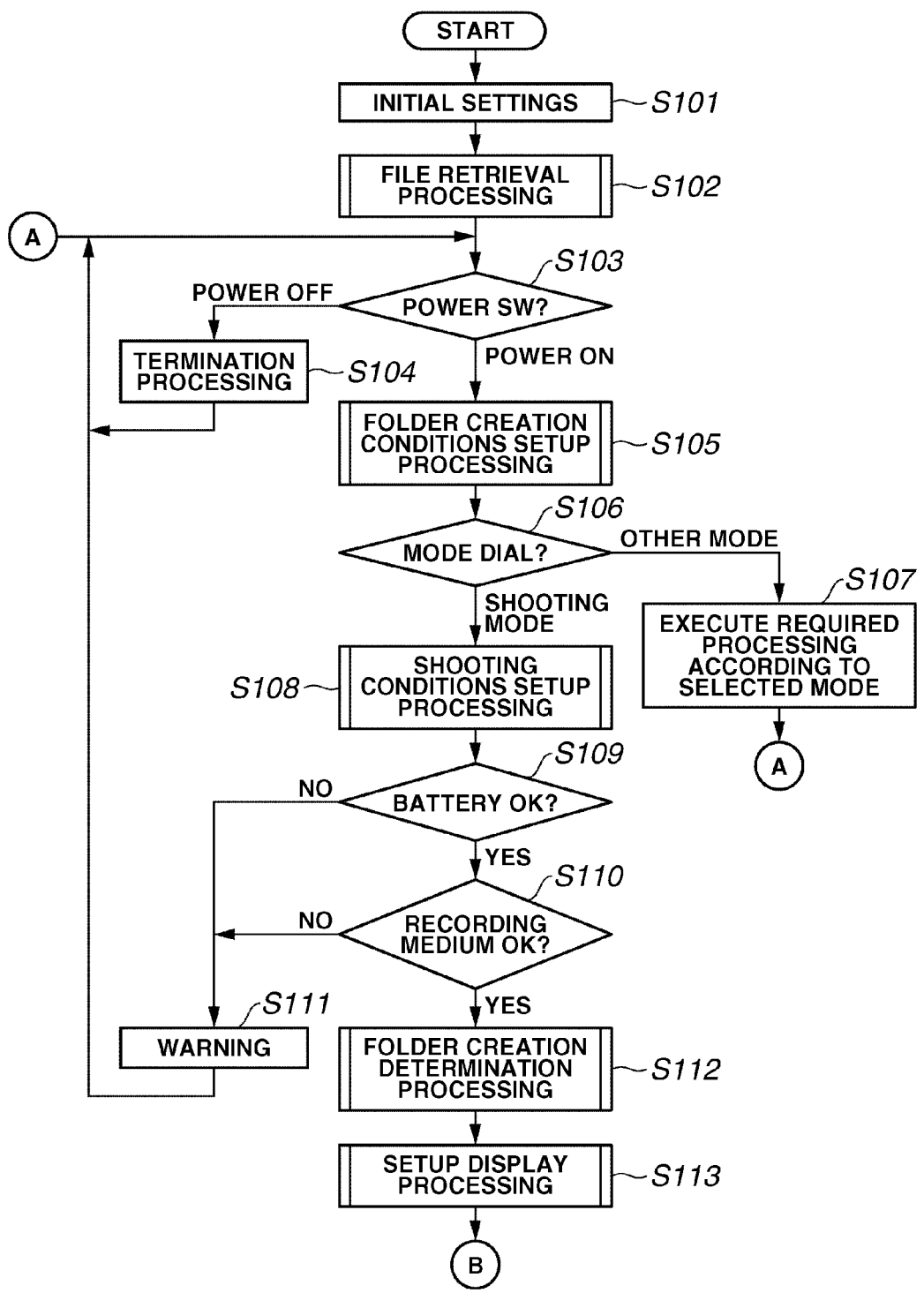
FIG. 2 is a flowchart showing part of an overall operation of the digital camera in accordance with a first exemplary embodiment.
Figure 3:
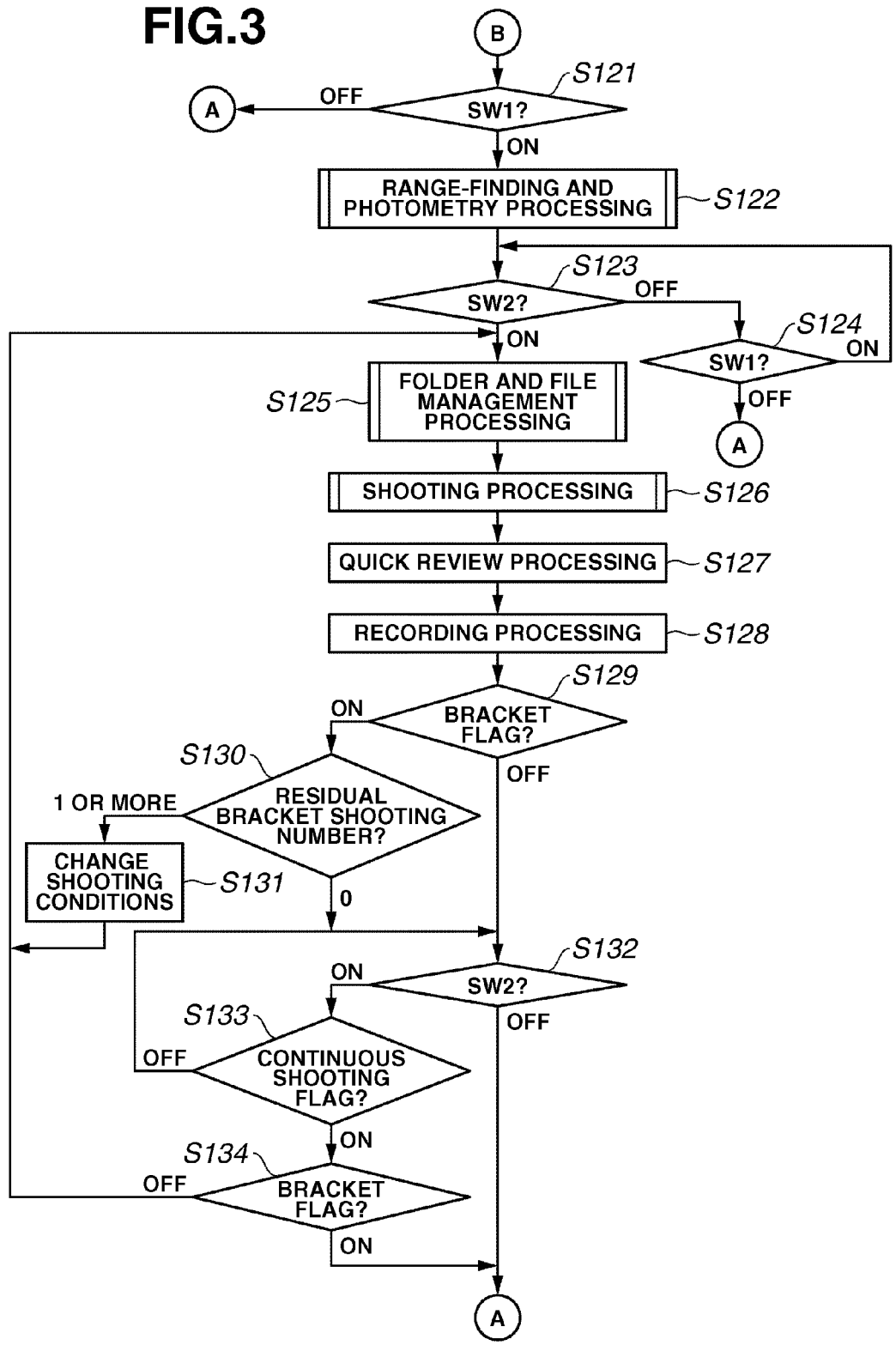
FIG. 3 is a flowchart showing the rest of the overall operation of the digital camera in accordance with the first exemplary embodiment.

The digital camera 100 of the present exemplary embodiment operates in the following manner. FIGS. 2 and 3 are flowcharts showing an overall operation of the digital camera 100 in accordance with the present exemplary embodiment.

Referring to FIG. 2, the system control circuit 50 initializes flags and variables for the controls in response to replacement of batteries or turning on of a main power source (refer to step S101), and executes file retrieval processing applied to a storage medium (refer to step S102). Details of the file retrieval processing in step S102 will be described later with reference to FIG. 7.

The system control circuit 50 checks a setting position of the power source switch 72 (refer to step S103). When the power source switch 72 is in a power OFF position, the processing flow proceeds to step S104 in which the system control circuit 50 executes predetermined termination processing.

The termination processing, for example, includes steps of: changing the display of each display section into a terminated state; closing the lens barrier 102 to protect the image capturing section; and recording into the nonvolatile memory 56 the parameters and setting values (including flags and control variables) and setting modes. The power source control section 80 stops supplying electric power from the power source to the image display section 28 and other sections. When the termination processing is completed, the processing flow returns to step S103.

On the other hand, when the power source switch 72 is in a power ON position in step S103, the system control circuit 50 sets folder creation conditions (refer to step S105). Details of the folder creation conditions setup processing in step S105 will be described later with reference to FIG. 8.

Next, the system control circuit 50 checks a setting position of the mode dial 60 (refer to step S106). When the mode dial 60 is set to a shooting mode, the system control circuit 50 sets shooting conditions (refer to step S108) and the processing flow proceeds to step S109. Details of the shooting conditions setup processing in step S108 will be described later with reference to FIG. 13. When the mode dial 60 is set to any other mode in step S106, the system control circuit 50 executes required processing in accordance with a selected mode (refer to step S107).

When the required processing is accomplished, the processing flow returns to step S103. In this case, practical modes other than the shooting mode include, for example, a playback mode.

In step S109, based on detection results of the power source control section 80, the system control circuit 50 determines whether a residual amount or an operation state of the power source 86 (e.g., battery) is acceptable. When the power source 86 is in an unacceptable situation in view of the operation of the digital camera 100, the system control circuit 50 causes the display section 54 to execute predetermined warning with images and/or voice to notify the problem (refer to step S111), and the processing flow returns to step S103.

On the other hand, when the power source 86 is in an acceptable situation, the processing flow proceeds to step S110 in which the system control circuit 50 checks the state of the recording medium. More specifically, the system control circuit 50 determines whether the recording medium 200 or 210 is attached to the digital camera 100 and obtains management information relating to the image data recorded in the attached recording medium.

In this process, the system control circuit 50 can determine whether there is any problem in a recording/playback operation of the recording medium. For example, the recording media 200 and 210 may not be attached to the digital camera 100, or a normal reading/writing operation may not be performed.

When there is any problem, the system control circuit 50 causes the display section 54 to execute predetermined warning with images and/or voice to notify the problem (refer to step S111), and the processing flow returns to step S103.

When there is no problem with respect to the recording medium in step S110, the system control circuit 50 performs a determination for determining the necessity of creating a new folder for storing captured image files (hereinafter, simply referred to as "image files") to be produced in the next shooting operation (refer to step S112).

In other words, the folder creation determination processing can be regarded as storage destination determination processing for designating either an existing folder or a new folder as a storage destination folder that stores an image file obtained in the next shooting operation. Details of the folder creation determination processing will be described later with reference to FIG. 9.

Next, the system control circuit 50 causes the display section 54 to display various setup states of the digital camera 100 with images and/or voice (refer to step S113). When the image display section 28 is in an ON state, the image display section 28 can be used to display various setup states of the digital camera 100 with images and/or voice. Details of the setup display processing will be described later with reference to FIG. 4.

Now referring to FIG. 3, next, the system control circuit 50 detects a state of the shutter switch SW1 (refer to step S121). When the shutter switch SW1 is not in an ON state (OFF in step S121; i.e., when the release button is not in a half pressed state), the processing flow returns to step S103. When the shutter switch SW1 is in an ON state, the processing flow proceeds to step S122.

In step S122, the system control circuit 50 executes range-finding processing (i.e., AF processing) for adjusting the focus of the imaging lens 10 on a subject as well as photometry processing (i.e., AE processing) for determining a diaphragm value and a shutter speed (refer to step S122). In the photometric processing, the system control circuit 50 can execute the settings for the flash if necessary. Details of the range-finding and photometry processing will be described later with reference to FIG. 5.

After accomplishing the range-finding and photometry processing, the system control circuit 50 checks the state of shutter switches SW1 and SW2 (refer to steps S123 and S124). When the shutter switch SW2 is not in an ON state (OFF in step S123) and the shutter switch SW1 is in an OFF state (OFF in step S124), the processing flow returns to step S103.

When the shutter switch SW1 is in an ON state and the shutter switch SW2 turns into an ON state (i.e., when the release button is fully pressed) (refer to step S123), the processing flow proceeds to step S125.

In step S125, the system control circuit 50 executes file and folder management processing including determination of a file name for an upcoming shooting operation and/or creation of a new folder according to the settings. Details of the folder and file management processing in step S125 will be described later with reference to FIG. 12.

Then, in step S126, the system control circuit 50 executes shooting processing. First, captured image data are written into the memory 30, via the image capturing element 12, the A/D converter 16, the image processing circuit 20, and the memory control circuit 22, or via the A/D converter 16 and directly the memory control circuit 22 (exposure processing).

Then, the memory control circuit 22 (if necessary, together with the image processing circuit 20) executes the shooting processing including developing processing for reading image data written in the memory 30 and performing various processing (refer to step S126). Details of the shooting processing will be described later with reference to FIG. 6.

After accomplishing the shooting processing, the system control circuit 50 executes quick view processing for displaying a captured image on the image display section 28 (refer to step S127).

When a delete instruction is not entered during a predetermined quick view time, the system control circuit 50 executes recording processing in step S128. More specifically, the system control circuit 50 reads captured image data from the memory 30 and causes the memory control circuit 22 (and the image processing circuit 20, if necessary) to execute various image processing.

Then, the system control circuit 50 causes the compression/expansion circuit 32 to execute image compression processing in accordance with a setting mode, add an orientation flag or additional information to the header, and create a captured image file complying with a predetermined recording file format. Next, the captured image file is written, via the interface 90 or 94 and the connector 92 or 96, into a predetermined recording destination of the recording medium 200 or 210 (e.g., a memory card or a compact flash (registered trademark) card).

When the image display section 28 is in an ON state, the system control circuit 50 causes the image display section 28 to display a message "BUSY" indicating progression of the writing operation during a recording medium writing operation (i.e., writing of image data into the recording medium 200 or 210). Furthermore, the system control circuit 50 causes the display section 54 to flicker the LED to indicate the progression of the recording medium writing operation.

Then, the system control circuit 50 checks the state of a bracket flag stored in an internal memory (not shown) or in the memory 52 (refer to step S129). The bracket flag is a flag representing execution/non-execution with respect to the bracket shooting. When the bracket flag is in an OFF state, the processing flow proceeds to step S132.

When the bracket flag is in an ON state (refer to step S129) and when the number of the remainder for the bracket shooting is equal to or larger than 1 (refer to step S130), the system control circuit 50 changes shooting conditions for the bracket shooting (refer to step S131) and the processing flow returns to step S125. The shooting conditions for the bracket shooting, for example, may include an exposure correction value and a white balance value.

In step S132, the system control circuit 50 detects the state of the shutter switch SW2. When the shutter switch SW2 is in an OFF state, the processing flow returns to step S103. On the other hand, when the shutter switch SW2 is an ON state, the system control circuit 50 detects the state of a continuous shooting flag stored in the internal memory or in the memory 52 (refer to step S133). When the continuous shooting flag is set (ON in step S133), the processing flow proceeds to step S134. Otherwise, when the continuous shooting flag is not set (OFF in step S133), the processing flow returns to step S132.

In step S134, the system control circuit 50 checks the state of the bracket flag again (refer to the processing of step S129). When the bracket flag is in an OFF state (refer to step S134), the processing flow returns to step S125 and the system control circuit 50 executes the next shooting processing. And, when the bracket flag is in an ON state, the processing flow returns to step S103. In other words, when the bracket flag is in an ON state, the present exemplary embodiment prohibits executing the continuous shooting.

[Exemplary Setup Display Processing]

Figure 4:
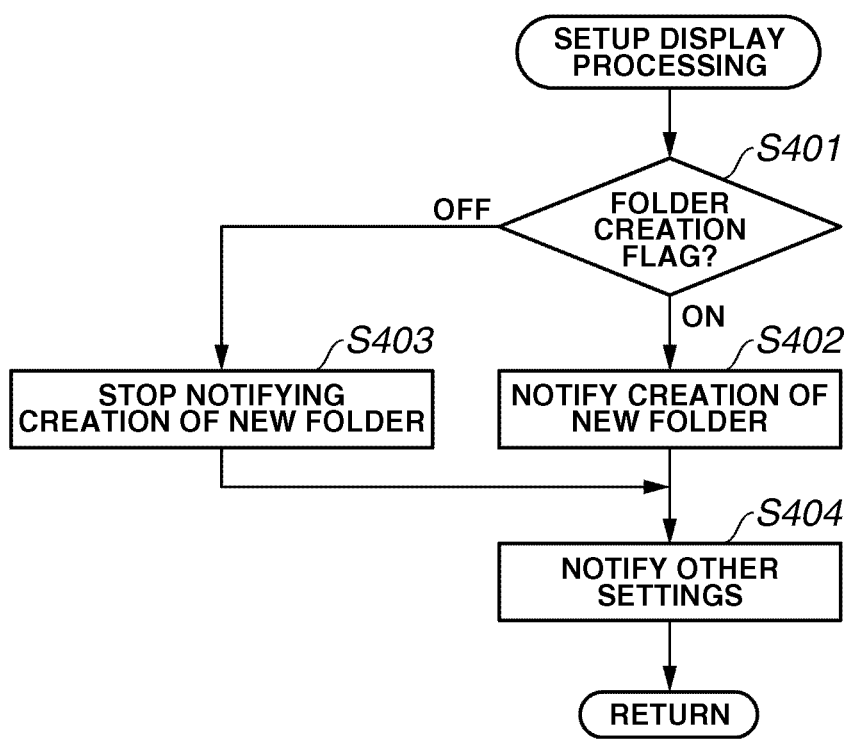
FIG. 4 is a flowchart showing exemplary details of setup display processing performed in step S113 of FIG. 2.

FIG. 4 is a flowchart showing exemplary details of the setup display processing performed in step S113 of FIG. 2. First, the system control circuit 50 checks the state of a folder creation flag stored in the internal memory of the system control circuit 50 or in the memory 52 (refer to step S401).

When the folder creation flag is set (ON in step S401), the system control circuit 50 causes the display section 54 to notify, with images and/or voice, that a new folder will be created in the next shooting (refer to step S402). It is noted that when the image display section 28 is in an ON state, the system control circuit 50 can cause the image display section 28 to notify the creation of a new folder with images and/or voice.

When the folder creation flag is not set (OFF in step S401), the system control circuit 50 causes the display section 54 (and the image display section 28) to stop notifying the creation of a new folder (refer to step S403). However, as described later, when the display section immediately updates the state (i.e., stops notifying the creation of a new folder) in response to creation of a new folder, it is unnecessary to execute the processing of step S403.

In step S404, the system control circuit 50 causes the display section 54 (and the image display section 28 if it is turned ON) to notify (or update the contents of notification), with images and/or voice, various setup states of the digital camera 100 other than the folder creation flag, and then terminates the setup display processing.

Figure 14:
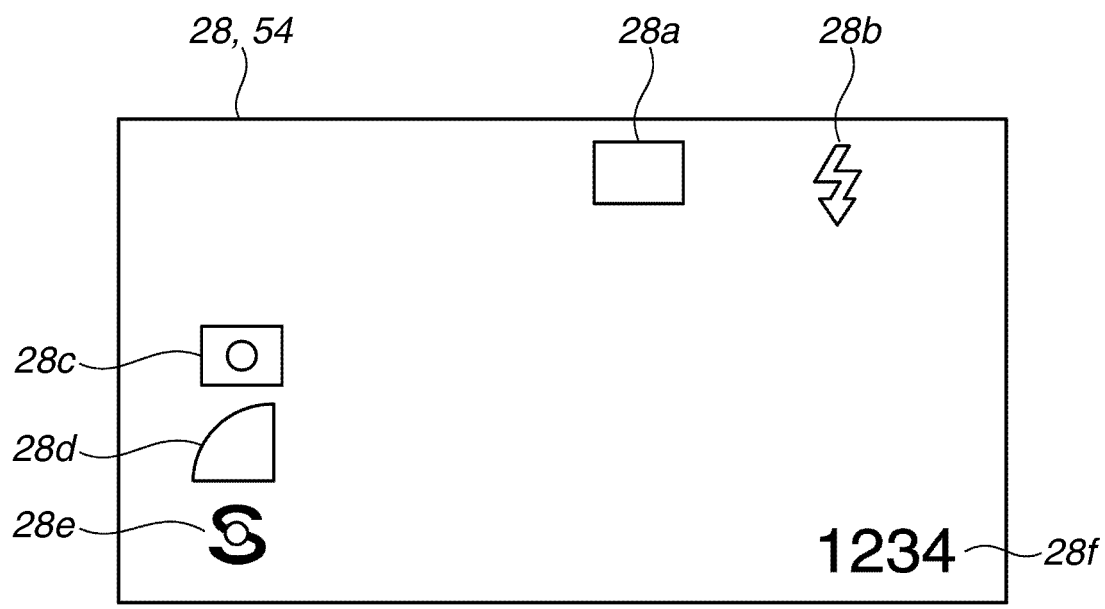
FIG. 14 is a view showing a display example used in the setup display processing performed by the digital camera in accordance with the first exemplary embodiment.

FIG. 14 shows a display example of the display section 54 (and the image display section 28) resulting from the processing of steps S403 and S404. The display example includes a single shot/continuous shot indication (28*a*), a flash indication (28*b*), a photometry method indication (28*c*), a compression rate indication (28*d*), a recording pixel number indication (28*e*), and a residual shot number indication (28*f*), which result from the processing of step S404.

Figure 15:
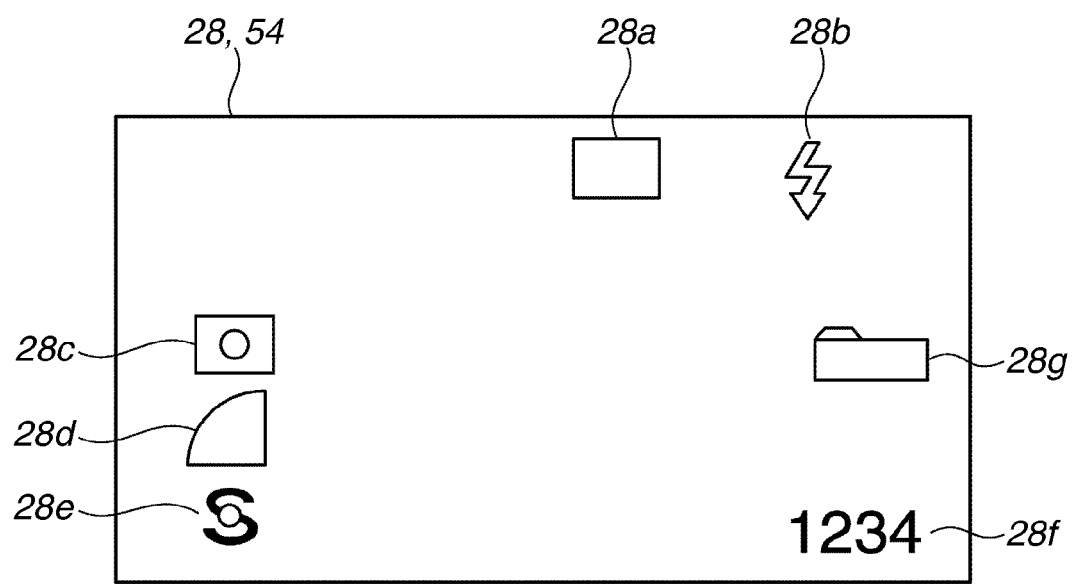
FIG. 15 is a view showing a display example used in the setup display processing in accordance with the first exemplary embodiment.

FIG. 15 shows a display example of the display section 54 (and the image display section 28) resulting from the processing of steps S402 and S404. Similar to FIG. 14, the display example includes a single shot/continuous shot indication (28*a*), a flash indication (28*b*), a photometry method indication (28*c*), a compression rate indication (28*d*), a recording pixel number indication (28*e*), and a residual shot number indication (28*f*). Furthermore, the display example of FIG. 15 includes a folder creation indication (28*g*) resulting from the processing of step S402.

As described above, when the selected mode is other than the shooting mode (refer to the processing of step S106 from FIG. 2), the system control circuit 50 does not execute the setup display processing of step S113. Thus, the folder creation indication is not displayed. For example, when the selected mode is a playback mode, the display for a playback mode is performed in the processing of step S107 and the folder creation indication is not displayed.

Furthermore, during the quick view processing performed in step S127 (from FIG. 3), it is unnecessary to display the folder creation indication (e.g., 28*g* shown in FIG. 15). Similarly, during the quick view processing performed in step S127, it is unnecessary to display various setup indications (e.g., 28*a* through 28*f* shown in FIG. 15) of the digital camera 100 other than the folder creation indication.

[Exemplary Range-Finding and Photometry Processing]

Figure 5:
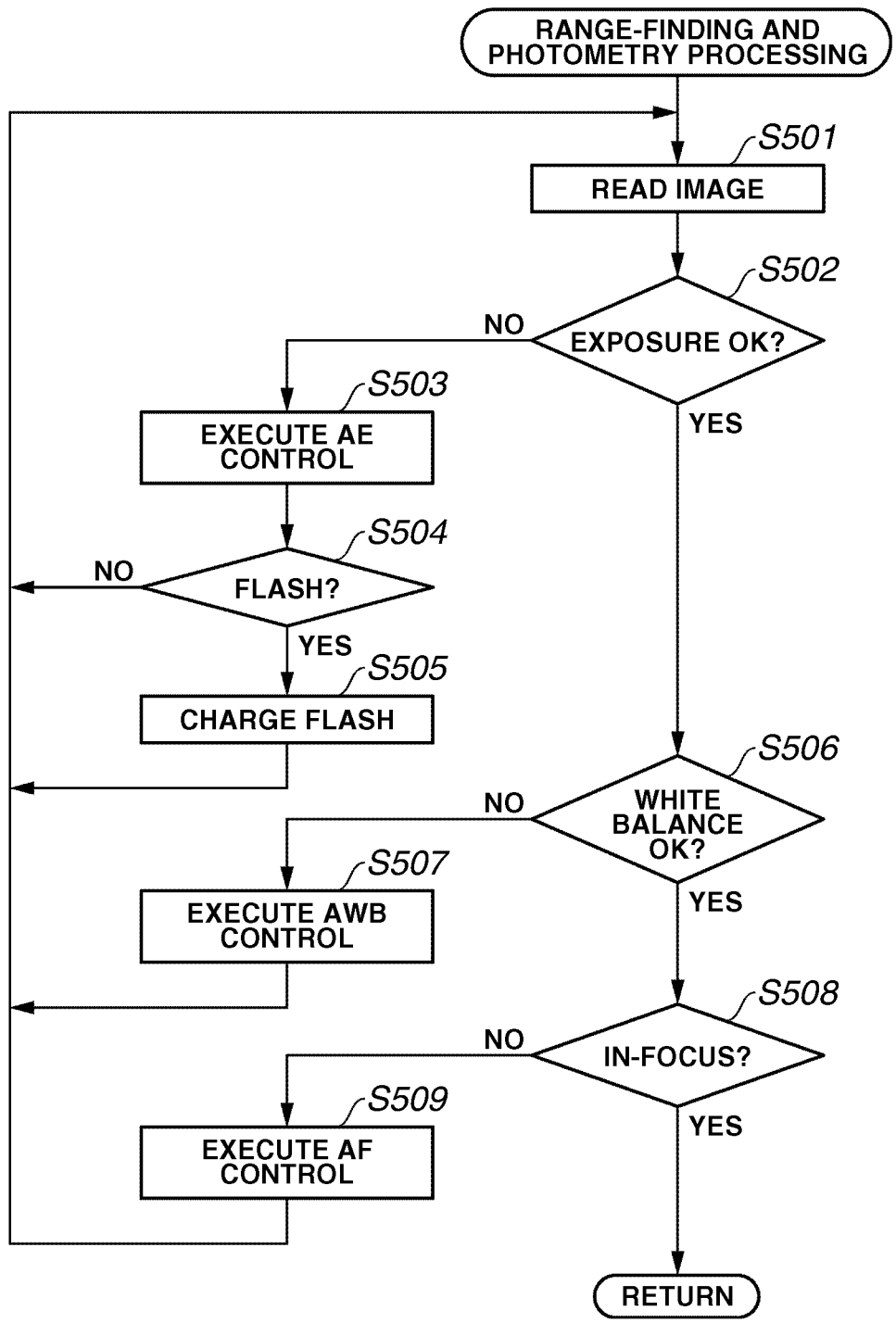
FIG. 5 is a flowchart showing exemplary details of range-finding and photometry processing performed in step S122 of FIG. 3.

FIG. 5 is a flowchart showing exemplary details of the range-finding and photometry processing performed in step S122 of FIG. 3. The system control circuit 50 reads a charge signal from the image capturing element 14 and successively inputs captured image data via the A/D converter 16 into the image processing circuit 20 (refer to step S501).

Next in step S502, the image processing circuit 20 performs predetermined calculations to determine whether the exposure is acceptable based on successively readout image data for the TTL (through the lens)-type AE (auto exposure) processing, EF (pre-flash emission) processing, AF (auto-focus) processing, and AWB (auto-white balance) processing.

In each processing, the image processing circuit 20 extracts a required number of specific portions from the entire captured pixels and calculates the calculations based on the extracted specific data. With this processing, the image processing circuit 20 can execute optimum calculations for respective modes (such as, centrally intensified mode, average mode, and evaluation mode) in each of the TTL-type AE, EF, AWB, AF processing.

If the exposure is not acceptable (NO in step S502), the system control circuit 50 causes the exposure control section 40 to execute the AE control based on calculation results obtained by the image processing circuit 20, until the auto exposure value becomes an appropriate value (refer to step S503).

Then, based on the measurement data obtained by the AE control, the system control circuit 50 determines whether the flash is necessary (refer to step S504). If not (NO in step S504), the process flow returns to step S501. On the other hand, when the flash is necessary (YES in step S504), the system control circuit 50 sets a flash flag to charge the flash 48 (refer to step S505). Then the process flow returns to step S501.

When the auto exposure value is appropriate in the determination of step S502, the system control circuit 50 stores the measurement data and/or setting parameters (photometry data) used for the auto-exposure control into the internal memory of the system control circuit 50 or into the memory 52.

After accomplishing the AE control processing, the system control circuit 50 executes auto-white balance (AWB) processing based on calculation results obtained by the image processing circuit 20 and measurement data obtained from the AE control (refer to steps S506 and S507). More specifically, when the white balance is not acceptable (NO in step S506), the system control circuit 50 causes the image processing circuit 20 to adjust color processing parameters in step S507, and then the process returns to step S501. The processes in steps S501, S502, S506 and S507 are repeatedly executed until an auto-white balance value becomes an appropriate value.

When the auto-white balance value is appropriate (YES in step S506), the system control circuit 50 stores the measurement data and/or setting parameters used for the AWB control into the internal memory of the system control circuit 50 or into the memory 52.

Next, the system control circuit 50 executes an AF control based on measurement data obtained from the AE control and the AWB control (refer to steps S508 and S509). Here, the system control circuit 50 causes the range-finding control section 42 to drive an AF lens and calculate an in-focus value, until an in-focus condition is established (refer to step S508). More, specifically, when the in-focus is not acceptable (NO in step S508), the system control circuit 50 executes AF control until an in-focus condition is established (refer to step S508), and then the process returns to step S501.

When the in-focus condition is established (refer to step S508), the system control circuit 50 stores the measurement data and or setting parameters used for the AF control into the internal memory of the system control circuit 50 or into the memory 52, and terminates the range-finding and photometry processing.

[Exemplary Shooting Processing]

Figure 6:
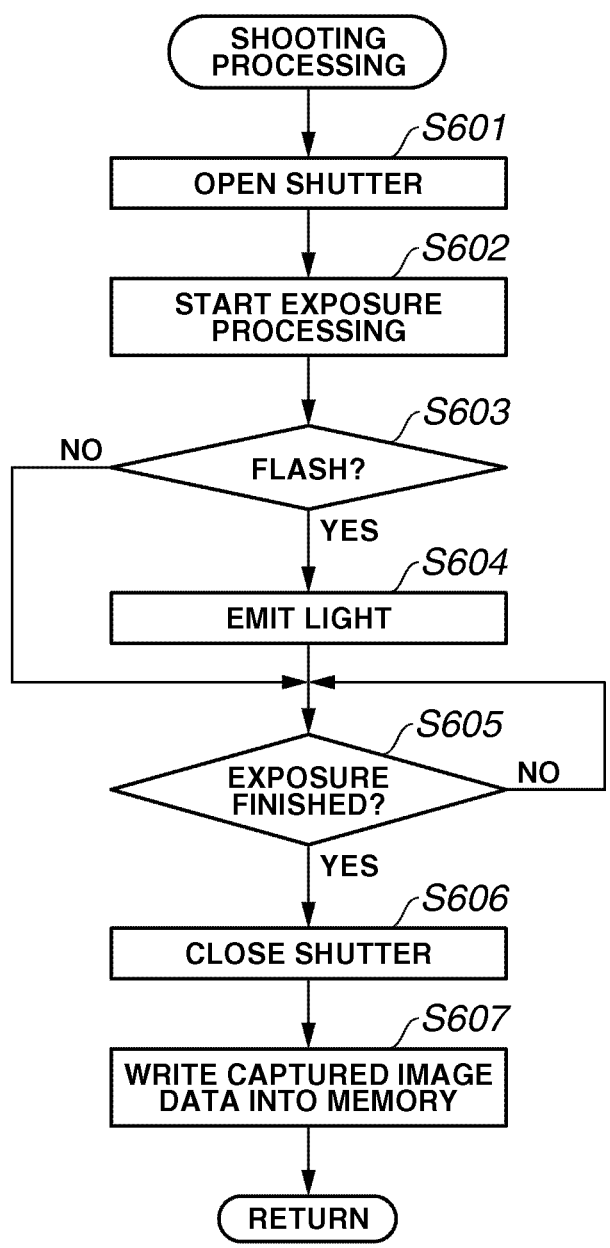
FIG. 6 is a flowchart showing exemplary details of shooting processing performed in step S126 of FIG. 3.

FIG. 6 is a flowchart showing exemplary details of the shooting processing performed in step S126 of FIG. 3. The system control circuit 50 causes the exposure control section 40 to open the shutter 12 having a diaphragm function based on a diaphragm value with reference to the photometry data stored in its internal memory or the memory 52 and start exposure processing for the image capturing element 10 (refer to steps S601 and S602).

Then, with reference to the flash flag, the system control circuit 50 determines whether light emission by the flash 48 is necessary (refer to step S603). When light emission is necessary (YES in step S603), the system control circuit 50 causes the flash 48 to emit light (refer to step S604). Otherwise, when light emission is not necessary (NO in step S603), the process flow proceeds to step S605.

When an exposure time (obtainable from the photometry data) required for the image capturing element 12 has elapsed (refer to step S605), the system control circuit 50 closes the shutter 12 (refer to step S606) and terminates the exposure processing.

Then, the system control circuit 50 reads a charge signal from the image capturing element 14, and writes captured image data into the memory 30 via the A/D converter 16, the image processing circuit 20, and the memory control circuit 22, or via the A/D converter 16 and directly the memory control circuit 22 (refer to step S607). After accomplishing the writing of captured image data into the memory 30, the system control circuit 50 terminates the shooting processing.

[Exemplary File Retrieval Processing]

Figure 7:
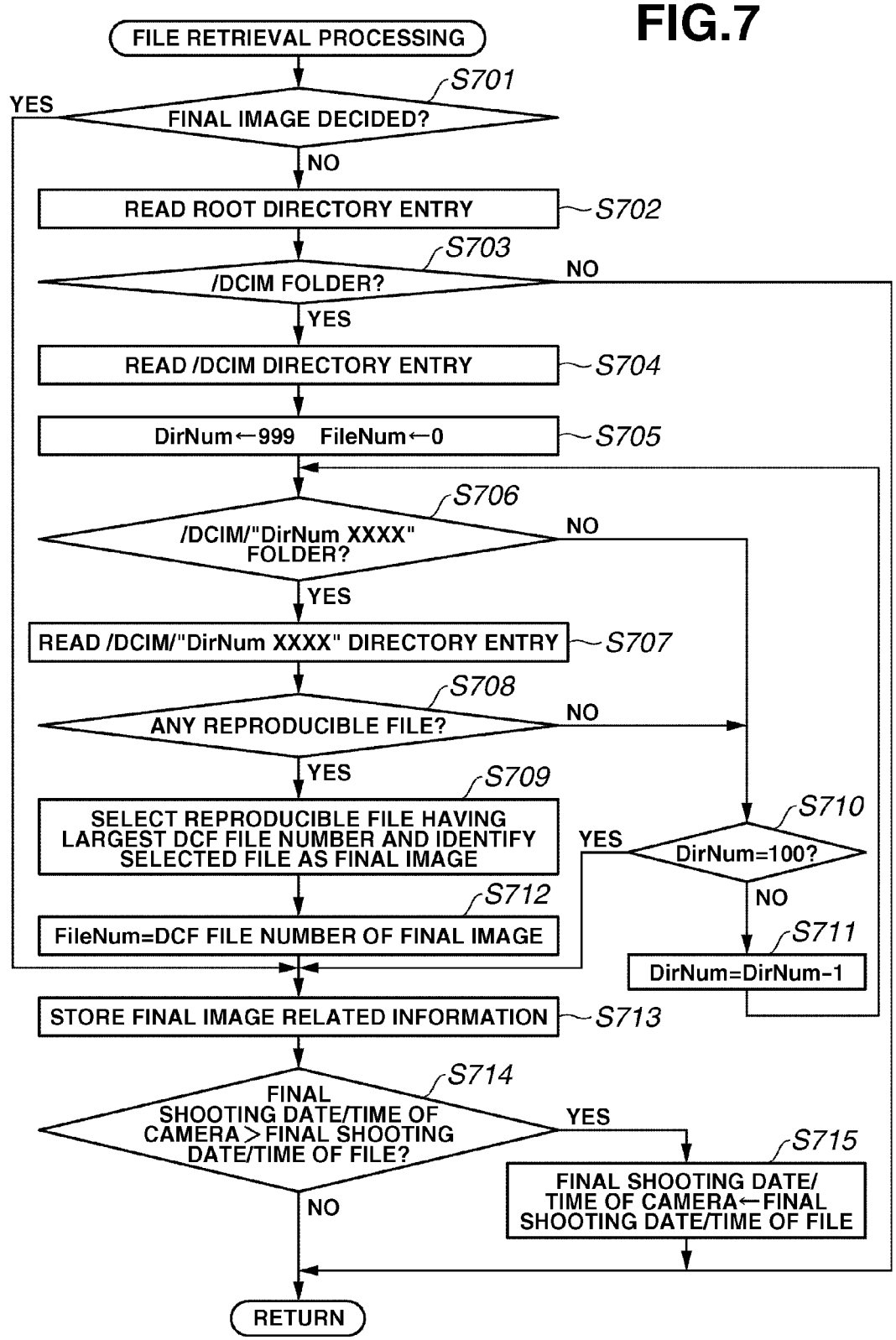
FIG. 7 is a flowchart showing exemplary details of file retrieval processing performed in step S102 of FIG. 2.

FIG. 7 is a flowchart showing exemplary details of the file retrieval processing performed in step S102 of FIG. 2. In step S701 it is determined whether the final image has been decided/retrieved. If yes, the process flow proceeds to step S713 (discussed later). If not, the process flow proceeds to step S702 where the system control circuit 50 reads a root directory entry from the recording medium 200 or 210. Next, the system control circuit 50 analyzes the root directory entry read in step S702 and checks the presence of a "/DCIM" folder (directory) (refer to step S703).

When the "/DCIM" folder is not present in the root directory entry, the system control circuit 50 decides that there is no playback image and terminates the file retrieval processing.

When the "/DCIM" folder is present in the root directory entry (YES in step S703), the system control circuit 50 reads the directory entry of "/DCIM" (see step S704) and sets a retrieval folder number (DirNum) to 999, i.e., a maximum number in the DCF standard (Design rule for Camera File system), and also sets a variable (FileNum) representing the file number to 0 (refer to step S705).

Then, the system control circuit 50 determines whether a corresponding folder is present (refer to step S706). More specifically, the system control circuit 50 determines whether a "/DCIM/(DirNum)XXXXX" folder (directory) is present in a recording medium. In the folder name, (DirNum) represents a value of the variable DirNum, i.e., a DCF directory number (999~100), and X represents an arbitrary ASCII half-size alphanumeric character. For example, when the value of the variable DirNum is "100" and XXXXX is "ABCDE," the folder name can be expressed as "/DCIM/100ABCDE."

In step S706, when a folder having a name "(DirNum)XXXXX" is present, the system control circuit 50 reads the contents of the directory entry (refer to step S707). Then, the system control circuit 50 determines whether a reproducible file is present (refer to step S708), for example by checking the presence of a file having a predetermined extension, such as jpg).

When a folder having a name "(DirNum)XXXXX" is not present (refer to step S706) or when there is no reproducible file (refer to step S708), the system control circuit 50 determines whether the value of DirNum has reached a minimum value (=100) at step S710. When the value of DirNum is greater than 100 (NO in step S710), the system control circuit 50 decrements the present value by 1 (refer to step S711). Then, the processing flow returns to step S706 to retrieve the next folder. When the value of DirNum is 100 (YES in step S710), the processing flow proceeds to step S713 (discussed later).

When any reproducible file is present in step S708, the system control circuit 50 selects a file having a largest DCF file number among the reproducible files and identifies the selected file as a final image (refer to step S709). For instance, the DCF file number can be represented by "0001~9999" as a number constituting lower 4 letters of the DCF file name (8 letters).

Then, in step S712, the system control circuit 50 sets a DCF file number of the final image as a variable FileNum. Next, in step S713, the system control circuit 50 stores the value of the variable FileNum, as final image related information, into its internal memory or into the memory 52. And, then the processing flow proceeds to step S714.

On the other hand, when the final image is already decided in step S701, the system control circuit 50 stores the values of determined DirNum and FileNum, as final image related information, into its internal memory or into the memory 52 (refer to step S713), and the processing flow proceeds to step S714.

For example, the system control circuit 50 concludes that the final image has been decided in step S701 when the nonvolatile memory 56 already stores the DCF directory number (DirNum) and the DCF file number (FileNum) of the final image determined in the previous file retrieval processing.

The final image related information stored in the internal memory of the system control circuit 50 or in the memory 52 in step S713 includes a DCF directory number (DirNum) of the folder including the above-described final image and a DCF file number (FileNum) of the final image.

In the present exemplary embodiment, in addition to the above data, the final image related information can include a total number of reproducible files included in the folder (directory), a shooting time of the final image, and a time stamp.

In the present exemplary embodiment, the DCF file number of the final image is stored in the nonvolatile memory 56 and the final image related information is stored in the internal memory of the system control circuit 50 or in the memory 52. However, the nonvolatile memory 56 can store other final image related information in addition to the DCF file number of the final image.

In a new image shooting operation, the system control circuit 50 decides a storage destination folder and a filename with a DCF directory number and a DCF file number succeeding the DCF directory number and the DCF file number of the final image retrieved in the above processing.

In step S714, determines whether the final shooting date/time of the camera is greater than the final shooting date/time of the file. In particular, the system control circuit 50 compares a shooting date/time of the final image decided in the above-described processing with a final shooting date/time of the digital camera 100 which is stored in the nonvolatile memory. If the final shooting date/time of the camera is greater than the final shooting date/time of the file, the process flow proceeds to step S715. Then, the system control circuit 50 designates and stores an older date/time as a final shooting date/time (refer to step S715). It is noted that the final shooting date/time can be used in a date/time change determination described in FIG. 10.

In this case, the older one between the final shooting date/time stored in the digital camera 100 and the shooting date/time of the final image stored in the recording medium is designated as a final shooting date/time.

Therefore, when an attached storage medium stores a final image older than the final shooting date/time stored in the digital camera 100, a new image file captured in the next shooting operation can be stored in a new folder, not in an existing folder of the storage medium. In other words, in the date/time change determination processing described with reference to FIG. 10, the probability of detecting a date/time change (=new folder creation) can be increased. On the other hand, if the final shooting date/time of the camera is not greater than the final shooting date/time of the file, the process flow finishes.

Figure 10:
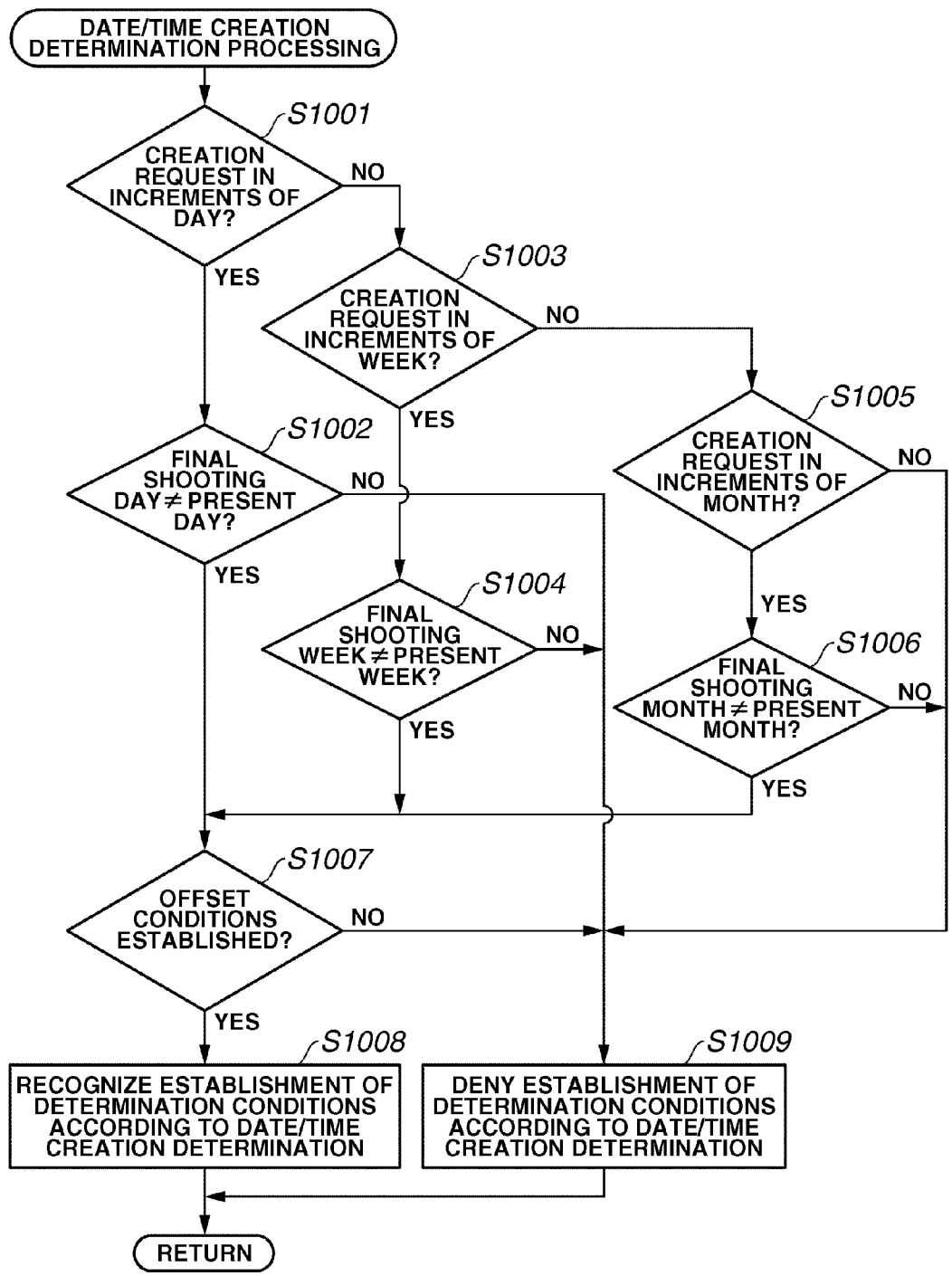
FIG. 10 is a flowchart showing exemplary details of date/time creation determination processing performed in step S903 of FIG. 9.

Needless to say, the processing of steps S713 and S714 can be omitted, if either the final shooting date/time stored in the digital camera 100 or the shooting date/time of the final image can be used as a final shooting date/time in the processing of FIG. 10. Furthermore, it is possible to allow a user to select a preferable final shooting date/time.

Furthermore, in the flowchart of FIG. 7, the final image to be retrieved is not limited to the file having the greatest DCF file number and can be, for example, a final image in a specific DCF directory according to the DCF standard or an image file finally recorded in the recording medium.

[Exemplary Folder Creation Conditions Setup Processing]

Figure 8:
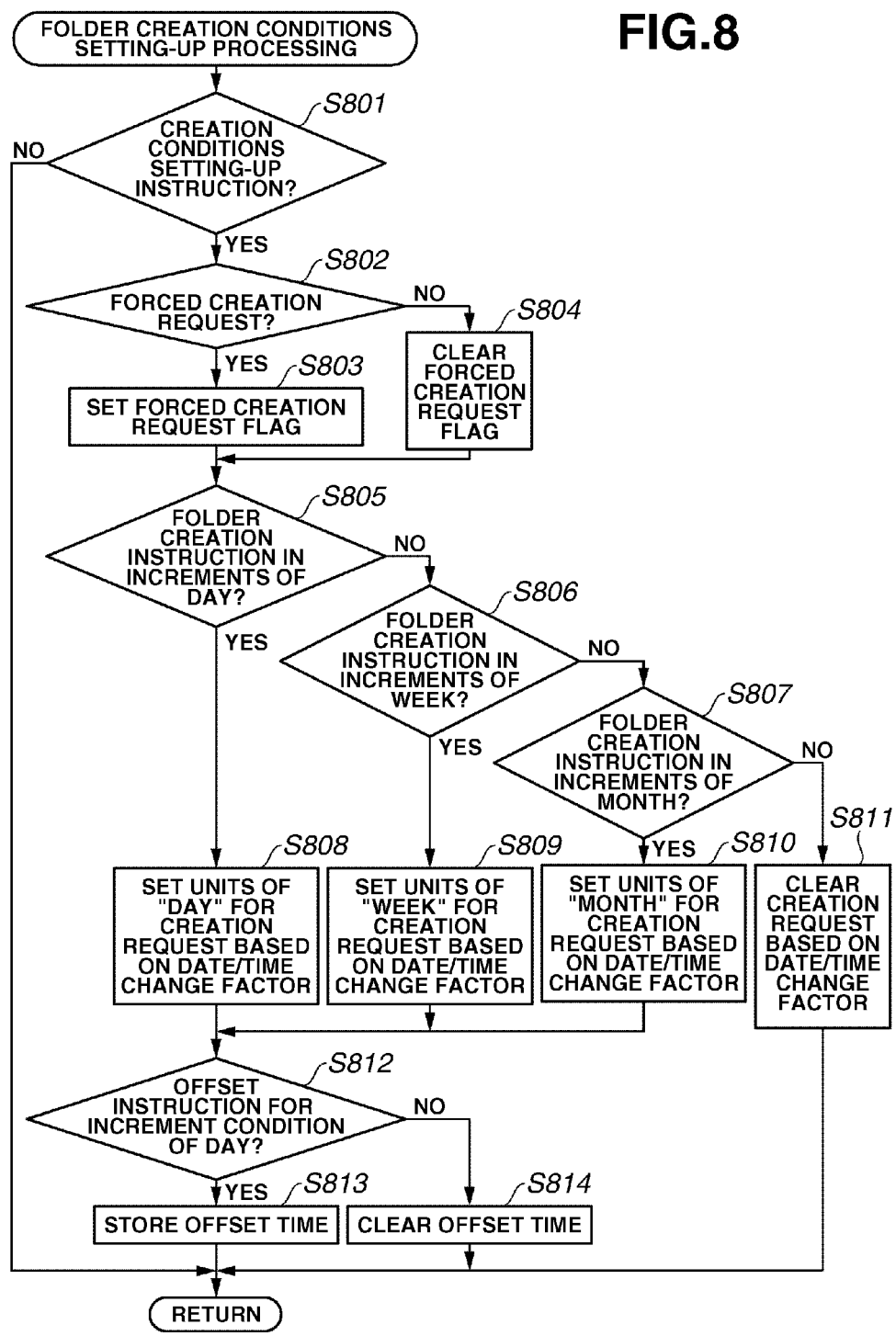
FIG. 8 is a flowchart showing exemplary details of folder creation conditions setup processing performed in step S105 of FIG. 2.

FIG. 8 is a flowchart showing exemplary details of the folder creation conditions setup processing performed in step S105 of FIG. 2. The system control circuit 50 executes later-described folder creation conditions setup processing in response to a user's instruction entered from the operating section 70 (refer to step S801).

In the present exemplary embodiment, a user can instruct the folder creation conditions settings:

by pressing the new folder creation request button 74; or by entering a folder creation request (including a forced creation request) through a later-described folder creation conditions setup menu screen.

In step S802, the system control circuit 50 determines whether a forced folder creation request is present. For example, the system control circuit 50 identifies the presence of a forced creation request when the new folder creation request button 74 is pressed in a state where a forced creation request flag is not set, or when a forced folder creation request is entered through the folder creation conditions setup menu screen.

When a forced creation request is present (YES in step S802), the system control circuit 50 sets a forced creation request flag which is provided as one region in the nonvolatile memory 56 (refer to step S803). On the other hand, when no forced creation request is present, the system control circuit 50 clears the forced creation request flag (refer to step S804). Accordingly, if the new folder creation request button 74 is pressed in a state that the forced creation request flag is set, the system control circuit 50 clears the forced creation request flag.

Next, in steps S805 through S807, the system control circuit 50 checks folder creation conditions that a user can set through the menu screen. In the present exemplary embodiment, a user can set the change of date, week, or month (i.e., date/time change) as folder creation conditions through the menu screen. The folder creation conditions being set by a user can be recorded into the nonvolatile memory 56, as a folder creation request by a date/time change factor.

Furthermore, in the present exemplary embodiment, a user can set an offset time as one of additional folder creation conditions relevant to the date/time change. The offset time can be set to intentionally shift, from 0 AM, the standard time giving a criterion for determining the change of date. When the offset is 0, the change of date occurs at 0 AM. However, if the offset time is "7 AM" (or "+7 hours"), the change of date does not occur at any time (including 0 AM) before 7 AM.

Setting the offset time enables a user to record a group of captured images in a night event (crossing 0 AM) into the same folder. Furthermore, it may be convenient for a user if the standard time for a new folder creation begins at a predetermined time the user usually gets up in the morning. In the present exemplary embodiment, the offset time can be designated as a practical time, such as "7 AM," or as a time difference, such as +7 hours or −2 hours, relative to the standard time (e.g., 0 AM).

Figure 24:
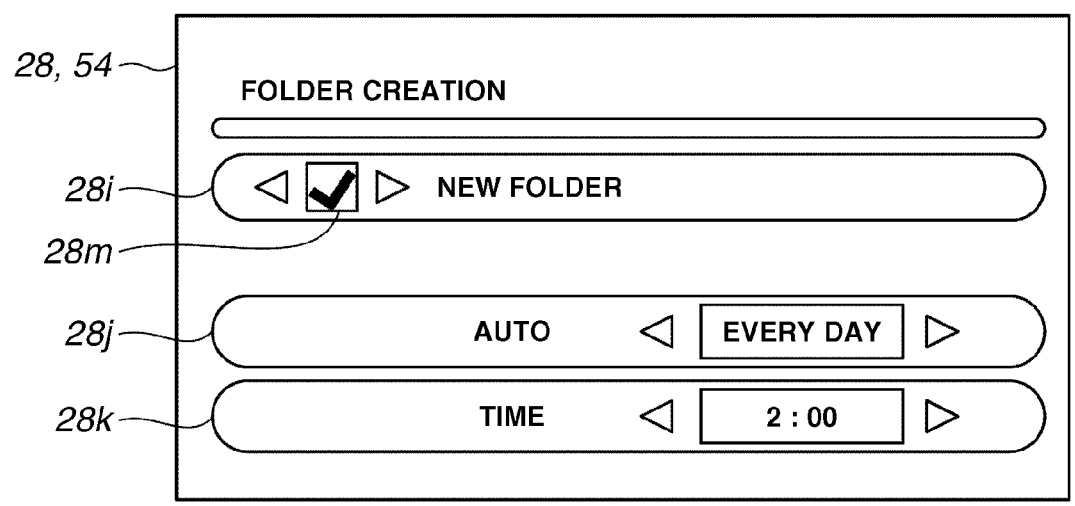
FIG. 24 is a view showing a folder creation conditions setup menu screen presented by the digital camera in accordance with an exemplary embodiment of the present invention.

FIG. 24 shows an example of the folder creation conditions setup menu screen used in the digital camera 100 of the present exemplary embodiment. The display section 54 and the image display section 28 can display the folder creation conditions setup menu screen.

In general, a user can select the folder creation conditions setup menu screen from an initial menu screen displayed when the user presses a menu key, with reference to its menu hierarchy. Furthermore, it is preferable to set a short-cut key for directly displaying the folder creation conditions setup menu.

The folder creation conditions setup menu screen includes a first region 28$i$ for a forced folder creation request, a second region 28$j$ for a folder creation request based on a date/time change factor, and a third region 28$k$.

For executing the forced folder creation request, a user can operate a predetermined key, such as an up-and-down key, of the operating section 70 to turn the first region 28$i$ into a selected state. Then, the user can operate a predetermined key, such as a right-left key, to put a check mark in a check box 28$m$ of the first region 28$i$. And, the user can press an execution key of the operating section 70.

After the above-described processing is accomplished, the menu screen is closed (i.e., the initial menu screen is displayed again) and the forced folder creation request is instructed to the digital camera 100.

For canceling the forced folder creation request, a user can remove a check mark from the check box 28$m$ and press the execution key. As described above, in the present exemplary embodiment, the user can press the new folder creation request button 74 to instruct or cancel a forced folder creation request without operating the menu screen.

On the other hand, for executing the folder creation request based on a date/time change factor, a user can turn the second region 28$j$ into a selected state to set the change factor. Then, the user can operate the right-and-left key to display desired conditions.

In this case, the date/time change factor is a date change ("every day"), a week change ("Monday," "Tuesday," "Wednesday," "Thursday," "Friday," "Saturday," and "Sunday"), or a month change ("every month," and "specific date (i.e., any one of 1st to 31st day)"). However, the present exemplary embodiment can include other date/time change factors, such as "Month: ○ and Day: x," "Holiday," or any other designation of time. For example, it is possible to designate a detailed specific date/time (such as, Month: ○, Day: x, and Hour/Minute: Δ:Δ). Furthermore, it is possible to designate a desired period of time, such as "from AM ○○ to AM xx."

As understood from the above description, the date/time change factor can be regarded as settings relating to date/time elapse or calendar conditions relative to the predetermined standard date/time. For canceling the folder creation request based on the date/time change factor, a user can turn the display into an OFF state.

Then, when there is no change in the settings of the offset time, a user can press the execution key of the operating section 70. Thus, the menu screen is closed (i.e., the initial menu screen is displayed again), and the folder creation request based on the date/time change factor is instructed to the digital camera 100. When a user wants to set an offset time, or when a user wants to change the time being currently set, the user can operate the third region 28$k$.

More specifically, under the condition that the third region 28$k$ is in a selected state, a user can operate the right-and-left key to display a desired time and can press the execution key. The offset time can be set, as described above, in the range of 0:00~23:59 in increments of 1 minute, or can be set as a time difference (±0:00~11:59) relative to the standard time (e.g., 0 AM).

Returning to FIG. 8, when a folder creation instruction in increments of a day is entered (refer to step S805), the system control circuit 50 sets the units of "day" for the creation request based on the date/time change factor stored in the nonvolatile memory 56 (refer to step S808). When a folder creation instruction in increments of a week is entered (refer to step S806), the system control circuit 50 sets the units of "week" for the creation request based on the date/time change factor stored in the nonvolatile memory 56 (refer to step S809). When a folder creation instruction in increments of a month is entered (refer to step S807), the system control circuit 50 sets the units of "month" for the creation request based on the date/time change factor stored in the nonvolatile memory 56 (refer to step S810).

Otherwise, the system control circuit 50 clears the creation request based on the date/time change factor stored in the nonvolatile memory 56 (refer to step S811), and terminates the folder creation conditions setup processing. When any folder creation instruction based on the units of date/time is entered, the system control circuit 50 confirms the presence of an offset instruction with respect to the date/time change detection (refer to step S812).

When the offset instruction is present (YES in step S812), the system control circuit 50 stores the offset time into the nonvolatile memory 56 (refer to step S813). When there is no offset instruction (NO in step S812), the system control circuit 50 clears the offset time, more specifically, sets the offset to 0 (refer to step S814). After steps S813 and S814, the folder creation conditions setting-up processing is complete.

The folder creation conditions being set in the folder creation conditions setup processing can be referred to in the later-described folder creation determination processing as well as in the file management processing, and can be used in a new folder creation presence determination.

In the present exemplary embodiment, the creation conditions can be exclusively set based on the date/time change factor (e.g., day, week, and month) or any combination of them. For example, the folder creation can be executed based on two conditions, e.g., every Monday and 1st day of every month. The date/time change factor can be set not only in units of "day" but also in units of "hour/minute."

Furthermore, the date/time change factor can be a specific date/time, such as "Month: ○, Day: x, and Hour/Minute: Δ:Δ." Furthermore, the date/time change factor can be designated as a desired period of time, such as "from AM ○○ to AM xx."

[Exemplary Folder Creation Determination Processing]

Figure 9:
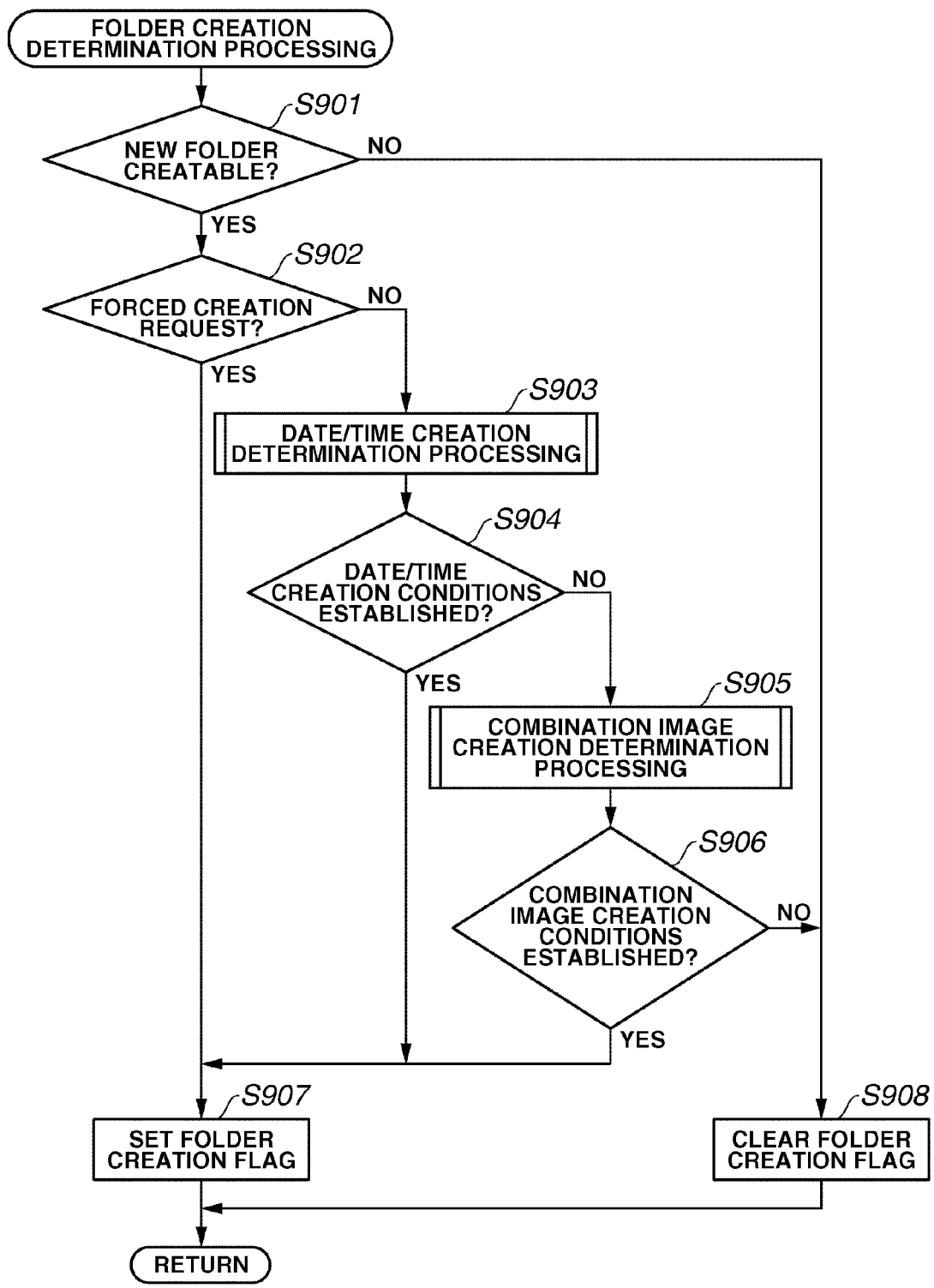
FIG. 9 is a flowchart showing exemplary details of folder creation determination processing performed in step S112 of FIG. 2.

FIG. 9 is a flowchart showing details of the folder creation determination processing performed in step S112 of FIG. 2. First, the system control circuit 50 determines whether creation of a new folder is feasible according to the DCF standard (refer to step S901). For example, according to the DCF standard, the DCF directory number is limited to 100~999. Thus, it is prohibited to create a folder having a DCF directory number in this range. More specifically, with respect to the DCF directory number and the file number, if folders and files are created according to the ascending order, the DCF directory number of a folder including the final image will be 999.

When creation of a new folder is unfeasible (No in step S901), the system control circuit 50 clears the folder creation flag stored in its internal memory or in the memory 52 (refer to step S908) and terminates the folder creation determination processing. On the other hand, when the creation of a new folder is feasible in step S901 (YES in step S901), the system control circuit 50 executes a new folder creation determination.

First, in step S902, the system control circuit 50 determines whether a forced creation request is present. In the present exemplary embodiment, the system control circuit 50 can confirm the presence of a forced creation request when the forced creation request flag stored in the nonvolatile memory 56 is set in step S803 of FIG. 8. In this case, the system control circuit 50 sets a folder creation flag stored in its internal memory or in the memory 52 (refer to step S907), and terminates the folder creation determination processing.

When no forced creation request is present in step S902, the system control circuit 50 executes date/time creation determination processing for checking the presence of a new folder creation request based on a date/time change (refer to step S903). When new folder creation conditions based on the date/time change are established, the system control circuit 50 sets a folder creation flag stored in its internal memory or in the memory 52 (refer to step S907) and terminates the folder creation determination processing.

When the new folder creation conditions are not established in step S904, the system control circuit 50 executes combination image creation determination processing for checking the presence of a new folder creation request based on later-described combination image conditions (refer to step S905).

When the new folder creation conditions based on combination image conditions are established (YES in step S904), the system control circuit 50 sets the folder creation flag stored in its internal memory or in the memory 52 (refer to step S907) and terminates the folder creation determination processing. In this case, the internal memory or the memory 52 can store, in addition to the flag, information indicating the history that the flag is set based on the combination image creation determination.

In step S906, it is determined whether combination image creation conditions are established. When the new folder creation conditions are established in step S906, the system control circuit 50 sets the folder creation flag stored in its internal memory or in the memory 52 (refer to step S907) and terminates the folder creation determination. When the new folder creation conditions are not established in step S906, the system control circuit 50 clears the folder creation flag stored in its internal memory or in the memory 52 (refer to step S908) and terminates the folder creation determination processing.

[Exemplary Date/Time Creation Determination Processing]

FIG. 10 is a flowchart showing exemplary details of the date/time creation determination processing performed in step S903 of FIG. 9. The "shooting date/time of a final image" in this processing is the date/time determined in step S714 and stored in step S715 of the above-described file retrieval processing.

When the creation request based on the date/time change can be set in increments of a day (refer to step S1001), the system control circuit 50 determines whether a shooting day of the final image (i.e., time stamp) is different from the present day (i.e., time information obtainable from a built-in clock of the digital camera 100) (refer to step S1002).

When the compared days are different from each other (YES in step S1002), the system control circuit 50 executes offset conditions determination processing (refer to step S1007). When the compared days are identical with each other, the processing flow proceeds to step S1009 (NO in step S1002).

When the creation request based on the date/time change can be set in increments of a week (YES in step S1003), the system control circuit 50 determines whether a shooting week of the final image is different from the present week (refer to step S1004).

When the compared weeks are different from each other (YES in step S1004), the system control circuit 50 executes the offset conditions determination processing (refer to step S1007). When the compared weeks are identical with each other (NO in step S1004), the processing flow proceeds to step S1009. In the present exemplary embodiment, the digital camera 100 has an ordinary calendar function and, therefore, can identify each week in each month in each year.

When the creation request based on the date/time change can be set in increments of a month (YES in step S1005), the system control circuit 50 determines whether a shooting month of the final image is different from the present month (refer to step S1006). Otherwise, the process flow proceeds to step S1009.

When the compared months are different from each other, the system control circuit 50 executes the offset conditions determination processing (refer to step S1007). When the compared months are identical with each other (NO in step S1005), the processing flow proceeds to step S1009.

In step S1009, i.e., when there is no creation request based on the date/time change, the system control circuit 50 denies establishment of determination conditions according to the date/time creation determination. Then the process ends.

In step S1007, the system control circuit 50 checks offset conditions with respect to the date/time change conditions. More specifically, when the difference in date/time is only one day in the condition that an offset time is set, the system control circuit 50 executes a determination considering the offset time. The difference of only one day may cause a difference in the week or month.

For example, if the shooting date/time of the final image is Jan. 31, 2005 and the present date/time is 3 AM, Feb. 1, 2005, and the offset time is 7 AM (or "+7 hours"), the shooting month of the final image will be different from the present month in the determination of step S1006. In this case, because the present date/time has not yet reached the offset time, the system control circuit 50 concludes that there is no date/time change.

When there is a date/time change as a result of the processing in step S1007 (i.e., consideration with respect to the offset conditions), the system control circuit 50 recognizes establishment of determination conditions according to the date/time creation determination (refer to step S1008) and terminates the date/time creation determination processing.

On the other hand, when there is no date/time change regardless of consideration of the offset conditions, the system control circuit 50 denies establishment of determination conditions according to the date/time creation determination (refer to step S1009) and terminates the date/time creation determination processing.

Furthermore, according to the example of FIG. 10, in addition to the condition settings described in FIG. 8, the system control circuit 50 can exclusively determine creation conditions based on the date/time change factor (e.g., day, week, and month) or any combination of them. For example, the system control circuit 50 can determine so that the folder creation can be executed based on two conditions, e.g., every Monday and 1st day of every month. The date/time change factor can be set not only in units of "day" but also in units of "hour/minute." Also, the date/time change factor can be a specific date/time, such as "Month: ○, Day: x, and Hour/Minute: Δ:Δ." Furthermore, the date/time change factor can be designated as a desired period of time, such as "from AM ○○ to AM xx."

[Exemplary Combination Image Creation Determination Processing]

Figure 11:
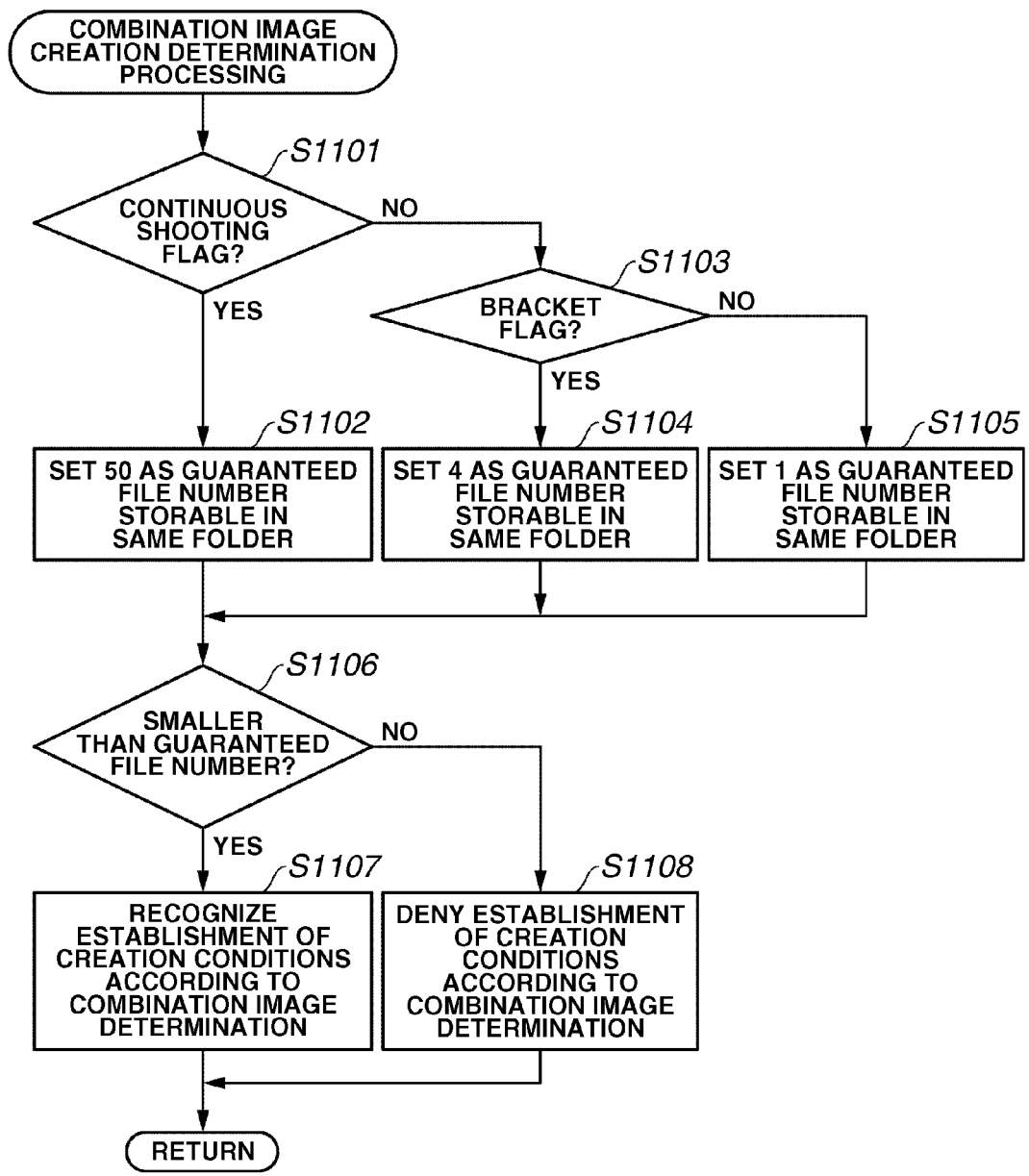
FIG. 11 is flowchart showing exemplary details of combination image creation determination processing performed in step S905 of FIG. 9.

FIG. 11 is a flowchart showing exemplary details of the combination image creation determination processing performed in step S905 of FIG. 9. First, the system control circuit 50 determines whether the present shooting mode is a continuous shooting mode (refer to step S1101).

When the present shooting mode is the continuous shooting mode, the system control circuit 50 sets a guaranteed file number (e.g., 50) storable in the same folder for a series of continuous shot image files (refer to step S1102). When the present shooting mode is not the continuous shooting mode, the system control circuit 50 determines whether the present shooting mode is a bracket mode (refer to step S1103). The bracket mode enables a user to capture several images while changing shooting conditions (for example, exposure or white balance).

When the present shooting mode is the bracket mode, the system control circuit 50 sets a guaranteed file number (e.g., 4) storable in the same folder for a series of bracket shot image files (refer to step S1104). When the present shooting mode is neither the continuous shooting mode nor the bracket mode, i.e., when the present shooting mode is an ordinary single shooting mode, the system control circuit 50 sets a guaranteed file number (e.g., 1) storable in the same folder for single shot image files (refer to step S1105).

Next, the system control circuit 50 determines whether a file number storable in an existing folder of the recording medium 200 or 210 is equal to or less than the guaranteed file number storable in the same folder being set in steps S1102, S1104, or S1105 (refer to step S1106). The file number storable in the existing folder can be obtained with reference to maximum file number set for a folder or a DCF file number of the final image in a folder.

For example, when a maximum file number is set for a folder, the file number storable in the existing folder is equal to a difference between an existing file number and the maximum file number, or a difference between the DCF file number of the final image and the maximum DCF file number (e.g., 9999).

When the file number storable in the existing folder is less than the guaranteed file number (YES in step S1106), the system control circuit 50 recognizes establishment of new folder creation conditions according to the combination image determination (refer to step S1107) and terminates the combination image creation determination processing.

Furthermore, when the file number storable in the existing folder is equal to or greater than the guaranteed file number storable in the same folder (YES in step S1106), the system control circuit 50 denies establishment of new folder creation conditions according to the combination image determination (refer to step S1108) and terminates the combination image creation determination processing.

As described above, when the existing folder cannot store a predetermined number of files required for performing recording of images according to given conditions, the system control circuit 50 establishes new folder creation conditions according to the combination image determination. Therefore, a new folder can be created in the succeeding shooting processing, and captured image files can be surely recorded into a new folder that guarantees storage of a sufficient number of files.

[Exemplary File Management Processing]

Figure 12:
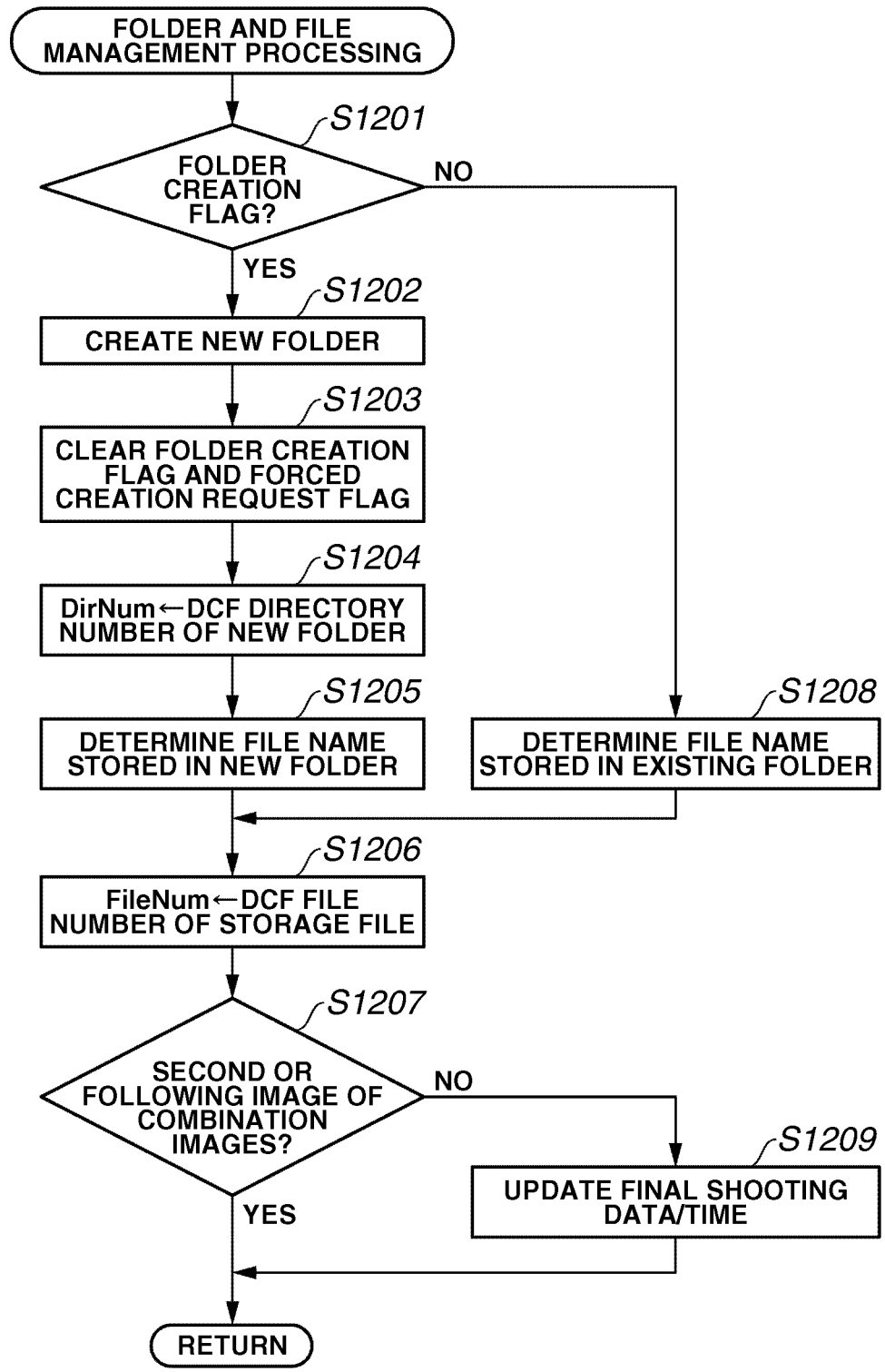
FIG. 12 is a flowchart showing exemplary details of folder and file management processing performed in step S125 of FIG. 3.

FIG. 12 is a flowchart showing exemplary details of the folder and file management processing performed in step S125 of FIG. 3. First, the system control circuit 50 determines whether the folder creation flag is set (refer to step S1201). The folder creation flag is stored in the internal memory of the system control circuit 50 or in the memory 52. When no folder creation flag is set, the system control circuit 50 decides a file name stored in an existing folder having a DCF directory number identical to the value of the variable DirNum (refer to step S1208).

On the other hand, when the folder creation flag is set, the system control circuit 50 creates a new folder (refer to step S1202), and clears the folder creation flag stored in its internal memory or in the memory 52 and also clears the forced creation request flag stored in the nonvolatile memory 56 (refer to step S1203). The processing of step S1203 can eliminate the possibility of creating unnecessary folders.

For example, the shooting date may change during a continuous shooting or bracket shooting operation (i.e., during a shooting operation of combination images). The folder creation conditions will be satisfied in this case. However, according to the present exemplary embodiment, no new folder is created and a series of captured image files can be surely stored in the same folder. In other words, during a shooting operation for series images, the system control circuit 50 neglects a new folder creation request based on a date/time change factor.

Furthermore, by referring to this flag later, it is possible to detect the history that the folder creation request has been cleared (i.e., a folder has been created by shooting). In the above-described setup display processing in step S402 shown in FIG. 4, the display can be updated with reference to this flag. The folder creation indication 28g (refer to FIG. 15), indicating settings of a new folder creation, can be erased in response to creation of a folder.

Next, the system control circuit 50 stores the DCF directory number of a new folder into the variable DirNum (refer to step S1204), and decides a file name stored in the new folder (refer to step S1205). For example, the DCF directory number of a new folder is greater by 1 than the DCF directory number of a folder storing a final image. When a file name is stored in a new folder, an initial value of the file number is 0001. Furthermore, upper 4 letters of the file name represent a character string allocated to the digital camera 100.

After accomplishing step S1205 (i.e., determining the storage file name), the system control circuit 50 stores the DCF file number of the storage file into the variable FileNum (refer to step S1206).

Next, the system control circuit 50 executes final shooting date/time update processing. In step S1207, the system control circuit 50 determines whether or not the captured image is a first image of combination images. When the captured image is a first image of combination images (NO in step S1209), i.e., when the captured image is a single shot image or a first image in continuous or combination shot images, the system control circuit 50 stores the present date/time in a shooting operation as a final shooting date/time into the nonvolatile memory 56 in step S1209 and then the process terminates. Otherwise, if in step S1207 the captured image is a second or following image of a combination of images (YES in step S1207), the process terminates.

The final shooting date/time can be used again in the date/time change determination described with reference to FIG.

10. Restricting update of the final shooting date/time in this manner (i.e., limited to a single shot image or a first image in continuous or combination shot images) can increase the probability of detecting a date/time change in the date/time change determination shown in FIG. 10 in a shooting operation, in particular, succeeding the combination shooting.

More specifically, the final shooting date/time can be kept unchanged during the combination image shooting operation. As a result, in the next shooting operation, a difference between the final shooting date/time and the present date/time becomes larger than an actual value. Creating a new folder becomes easy under a condition that a new folder creation request based on a date/time change factor is set. Accordingly, combination image files and succeeding image files can be surely stored in different folders. However, such controls are not always necessary. The final shooting date/time can be updated each time the shooting operation is completed. Furthermore, a user can arbitrarily select the final shooting date/time.

[Exemplary Shooting Conditions Setup Processing]

Figure 13:
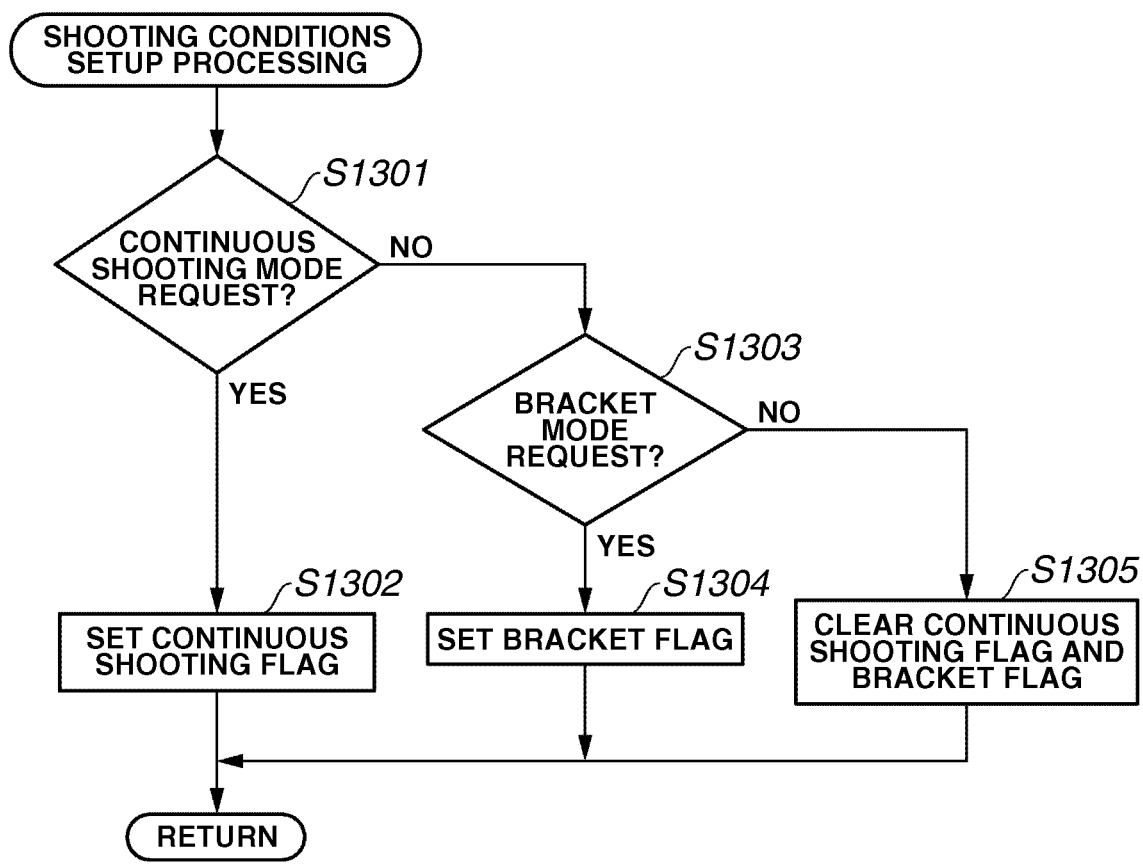
FIG. 13 is a flowchart showing exemplary details of shooting conditions setup processing performed in step S108 of FIG. 2.

FIG. 13 is a flowchart showing details of the shooting conditions setup processing performed in step S108 of FIG. 2. First, the system control circuit 50 determines whether the mode dial 60 is set to the continuous shooting mode (refer to step S1301). When the mode dial 60 is set to the continuous shooting mode, the system control circuit 50 sets a continuous shooting flag which is stored in its internal memory or in the memory 52 (refer to step S1302). The continuous shooting flag indicates that the present shooting mode is the continuous shooting mode. Then, the system control circuit 50 terminates the shooting conditions setup processing.

When the mode dial 60 is not set to the continuous shooting mode, the system control circuit 50 determines whether the mode dial 60 is set to the bracket mode (refer to step S1303). When the mode dial 60 is set to the bracket mode, the system control circuit 50 sets a bracket flag which is stored in its internal memory or in the memory 52 (refer to step S1304). The bracket flag indicates that the present shooting mode is the bracket shooting mode. Then, the system control circuit 50 terminates the shooting conditions setup processing.

When the mode dial 60 is not set to the continuous shooting mode or the bracket mode, the system control circuit 50 clears both the continuous shooting flag and the bracket flag stored in its internal memory or in the memory 52 (refer to step S1305), and terminates the shooting conditions setup processing.

As described above, the present exemplary embodiment can automatically create a new folder according to given settings, and store captured image files into the new folder. Thus, a user is not forced to create a new folder.

Furthermore, the present exemplary embodiment creates a new folder in response to an actual shooting instruction. In other words, the present exemplary embodiment does not create a new folder unnecessarily, for example, when storage media are replaced. More specifically, the present exemplary embodiment can prevent a created folder from being left for a longtime without being used or from being lost. Thus, the present exemplary embodiment can solve the conventional problems.

Moreover, the present exemplary embodiment allows a user to select and set desirable conditions for automatically creating a new folder. Thus, captured image files can be automatically sorted according to user's preference.

Furthermore, according to the present exemplary embodiment, establishment of the conditions for automatically creating a new folder is determined based on the final shooting date/time and the shooting date/time of a succeeding captured image. Thus, the change in various date/time units (e.g., year, month, week, and day) can be detected through the common processing. Accordingly, the determination can be appropriately performed regardless of change in the automatic folder creating conditions Additionally, when the date/time change factor is one of the automatic folder creating conditions, the present exemplary embodiment allows a user to set an offset time as part of the determination conditions so that individual users can create new folders in a way they like.

Furthermore, according to the present exemplary embodiment, the final shooting date/time is a shooting date/time of the final image stored in a recording medium or a final shooting date/time of the image processing apparatus. Thus, appropriate standard date/time information (i.e., an object to be compared) can be obtained even when recording media are replaced.

Furthermore, storing the shooting date/time of the final image stored in a recording medium enables to determine the necessity of creating a folder, without re-inspecting a recording medium, in a start-up operation of the image processing apparatus. Therefore, succeeding shooting processing can be promptly started.

Moreover, the present exemplary embodiment updates the stored final shooting date/time and/or the shooting date/time of the final image stored in a recording medium in response to replacement of recording media and/or a new shooting operation. Thus, the inspection of a recording medium and the storage work in the image processing apparatus can be minimized. Disagreement in the information can be eliminated.

Further, in addition to the condition settings for automatically creating a new folder, the present exemplary embodiment enables a user to set an unconditional creation of a new folder in the next shooting operation so as to satisfy various requirements. In particular, the new folder creation request button 74 is convenient for a user to quickly instruct creation of a new folder immediately before starting a preceding shooting operation.

Furthermore, when a new folder cannot be created as a storage destination, the present exemplary embodiment can store captured image files into an existing folder. Thus, the present exemplary embodiment can eliminate failure in recording the captured image files.

Additionally, in a case that additional image files cannot be stored in the existing folder as a storage destination, the present exemplary embodiment can create a new folder and store captured image files in the new folder. Thus, the present exemplary embodiment can eliminate failure in the recording of captured image files.

Furthermore, it may be desirable to handle, as one group, a series of plural image files (i.e., combination image files) captured in the continuous shooting operation or in the bracket shooting operation. In such a case, the present exemplary embodiment creates a new folder depending on whether a predetermined number of image files can be stored in the existing folder. Therefore, even when an existing folder is a storage destination, a series of captured image files can be surely stored in the same folder.

In addition, the present exemplary embodiment notifies a user of creation of a new folder in the next shooting operation. Therefore, the user can confirm the creation of a new folder. The setting conditions may not be immediately satisfied. In this respect, it is important to enable a user to confirm beforehand the state that the setting conditions are accurately recognized and executed.

Furthermore, when a user knows the creation of a new folder, the user can cancel the reservation of folder creation or change the settings at appropriate timing if necessary. Thus, the present exemplary embodiment enables a user to flexibly configure a desired folder structure.

Moreover, when the image processing apparatus automatically designates a new folder as a storage folder for the captured image files, a user can know such changes. Therefore, the user can know a head image stored in the new folder and can easily retrieve the captured images.

Furthermore, the present exemplary embodiment prohibits creating a new folder during a combination image shooting operation, regardless of the presence of a new folder creation request based on a date/time change factor. Therefore, even when the new folder creating conditions based on a date/time change factor are satisfied, the present exemplary embodiment can prevent the combination image files from being separately stored into different folders.

Furthermore, according to the present exemplary embodiment, the final shooting date/time is a shooting time of an image in the single shooting mode or a shooting time of the head image in the combination image shooting mode. Therefore, when a date/time change occurs as a factor of new folder creation during a combination image shooting operation, captured image files can be surely stored into the new folder in the next shooting operation.

And also, when the final image file stored in a recording medium is an image captured in a single shooting mode, the shooting time of this image is the final shooting date/time in the recording medium. When the final image file stored in a recording medium is part of combination images, the shooting time of the head image of the combination images is regarded as the final shooting date/time in the recording medium.

Thus, even when the images already stored in a recording medium are the images captured when a date/time change occurs as a folder switching factor during a combination image shooting operation, captured image files can be surely stored into a new folder in the next shooting operation.

Furthermore, the present exemplary embodiment designates an older date/time between the final shooting date/time of the image processing apparatus and the shooting date/time of the final image data in the recording medium, as the final shooting date/time used in a new folder creation necessity determination. Thus, an appropriate determination can be executed even when plural recording media are used.

Second Exemplary Embodiment

Next, various exemplary operations of the digital camera will be described with reference to FIGS. 3, 5-13, 15-17, and 23, as an example of the image processing apparatus in accordance with a second exemplary embodiment of the present invention.

A digital camera according to the second exemplary embodiment is similar to the digital camera 100 of the first exemplary embodiment in its function arrangement (refer to FIG. 1). In the following description, the digital camera according to the second exemplary embodiment will be denoted by the same reference numeral (i.e., 100).

First, an overall exemplary operation of the digital camera 100 will be described with reference to the flowcharts of FIGS. 23 and 3. The system control circuit 50 initializes flags and variables for the controls in response to replacement of batteries or turning on of a main power source (refer to step S2301), and sets "start-up" as a preceding mode name stored in its internal memory or in the memory 52 (refer to step S2302).

Then, the system control circuit 50 executes file retrieval processing applied to the storage medium (refer to step S2303). As described above, the flowchart of FIG. 7 shows exemplary details of the file retrieval processing performed in step S2303 of FIG. 23.

Then, the system control circuit 50 checks a setting position of the power source switch 72 (refer to step S2304). When the power source switch 72 is in a power OFF position, the processing flow proceeds to step S2305 in which the system control circuit 50 executes termination processing.

The termination processing, for example, includes steps of changing the display of each display section into a terminated state; closing the lens barrier 102 to protect the image capturing section; and recording into the nonvolatile memory 56 the parameters and setting values (including flags and control variables) and setting modes. The power source control section 80 stops supplying electric power from the power source to the image display section 28 and other sections. When the termination processing is completed, the processing flow returns to step S2304.

On the other hand, when the power source switch 72 is in a power ON position in step S2304, the system control circuit 50 sets folder creation conditions (refer to step S2306). As described above, the flowchart of FIG. 8 shows the details of the folder creation conditions setup processing performed in step S2306.

Next, the system control circuit 50 checks a setting position of the mode dial 60 (refer to step S2307). When the mode dial 60 is set to a shooting mode, the system control circuit 50 sets shooting conditions (refer to step S2308) and the processing flow proceeds to step S2311. As described above, the flowchart of FIG. 13 shows exemplary details of the shooting conditions setup processing performed in step S2308.

When the mode dial 60 is set to any other mode in step S2307, the system control circuit 50 executes required processing in accordance with a selected mode (refer to step S2309). When the required processing is accomplished, the system control circuit 50 sets a present mode name as the preceding mode name stored in its internal memory or in the memory 52 (refer to step S2310). Then, the processing flow returns to step S2304.

In step S2311, based on detection results of the power source control section 80, the system control circuit 50 determines whether a residual amount or an operation state of the power source 86 (e.g., battery) is acceptable. When the power source 86 is in an unacceptable situation in view of the operation of the digital camera 100 (NO in step S2308), the system control circuit 50 causes the display section 54 to execute predetermined warning with images and/or voice to notify the problem (refer to step S2313), and the processing flow returns to step S2304.

On the other hand, when the power source 86 is in an acceptable situation, the processing flow proceeds to step S2312 in which the system control circuit 50 checks the state of the recording medium. More specifically, the system control circuit 50 determines whether the recording medium 200 or 210 is attached to the digital camera 100 and obtains management information relating to the image data recorded in the attached recording medium.

In this process, the system control circuit 50 can determine whether there is any problem in a recording/playback operation of the recording medium. For example, the recording media 200 and 210 may not be attached to the digital camera 100, or a normal reading/writing operation may not be performed.

When there is any problem (NO in step S2312), the system control circuit 50 causes the display section 54 to execute predetermined warning with images and/or voice to notify the problem (refer to step S2313), and the processing flow returns to step S2304. When there is no problem with respect to the recording medium in step S2312, the system control circuit 50 performs a determination for determining the necessity of creating a new folder for storing captured image files to be produced in the next shooting operation (refer to step S2314).

As described above, the flowchart of FIG. 9 shows exemplary details of the folder creation determination processing. FIG. 10 shows the details of the date/time creation determination processing performed in step S903 of FIG. 9. FIG. 11 shows exemplary details of the combination image creation determination processing performed in step S905 of FIG. 9.

Next, the system control circuit 50 causes the display section 54 to display various setup states of the digital camera 100 with images and/or voice (refer to step S2315). When the image display section 28 is in an ON state, the image display section 28 can be used to display various setup states of the digital camera 100 with images and/or voice. The details of the setup display processing will be described later with reference to FIG. 16.

Then, the system control circuit 50 sets "shooting" as the preceding mode name stored in its internal memory or in the memory 52 (refer to step S2316). The processing flow proceeds to step S121 of FIG. 3, and the system control circuit 50 executes the remaining processing of the digital camera 100 shown in the flowchart of FIG. 3.

As already described, the flowchart of FIG. 5 shows exemplary details of the range-finding and photometry processing performed in step S122 of FIG. 3. The flowchart of FIG. 12 shows exemplary details of the folder and file management processing performed in step S125 of FIG. 3. The flowchart of FIG. 6 shows exemplary details of the shooting processing performed in step S126 of FIG. 3.

[Exemplary Setup Display Processing]

Figure 16:
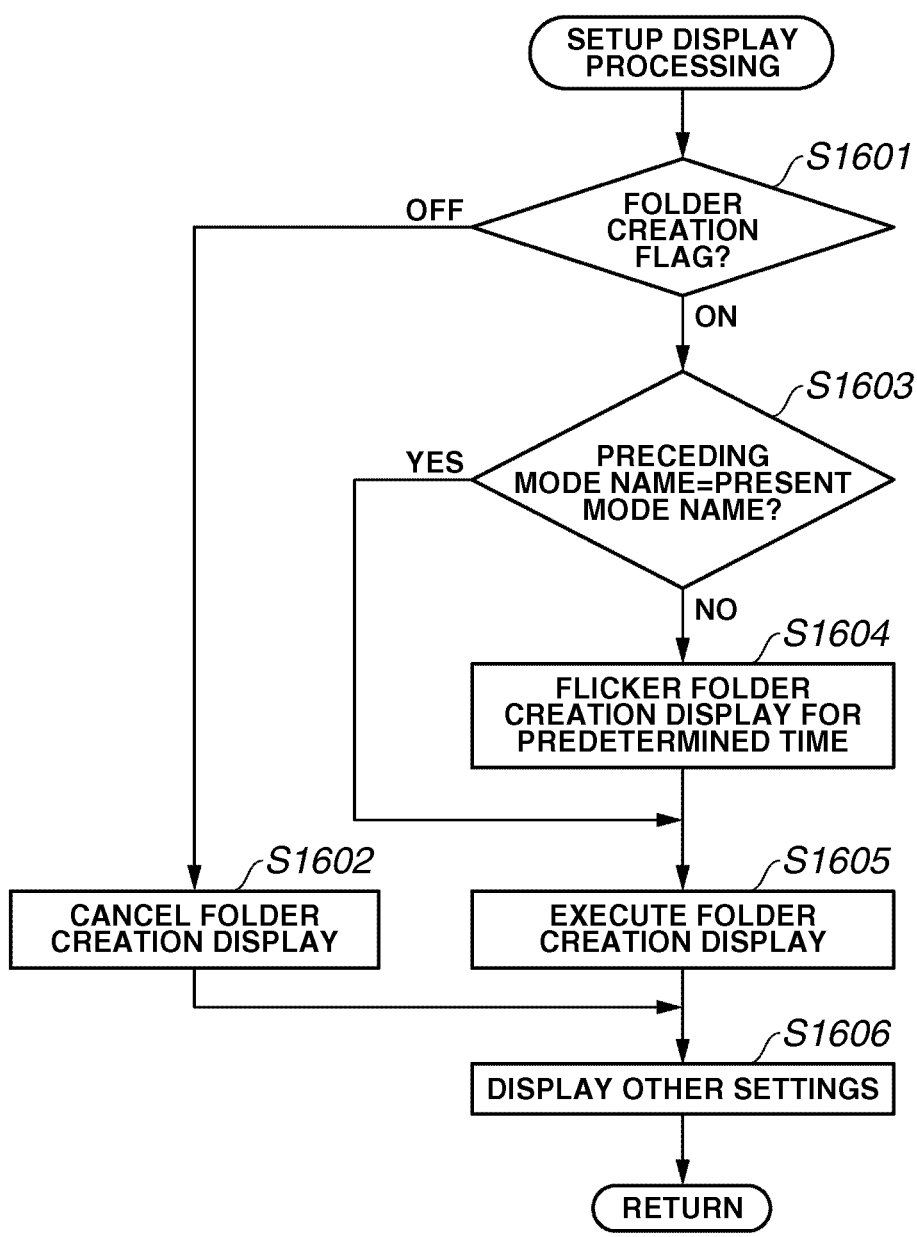
FIG. 16 is a flowchart showing details of setup display processing performed by a digital camera in accordance with a second exemplary embodiment.
Figure 23:
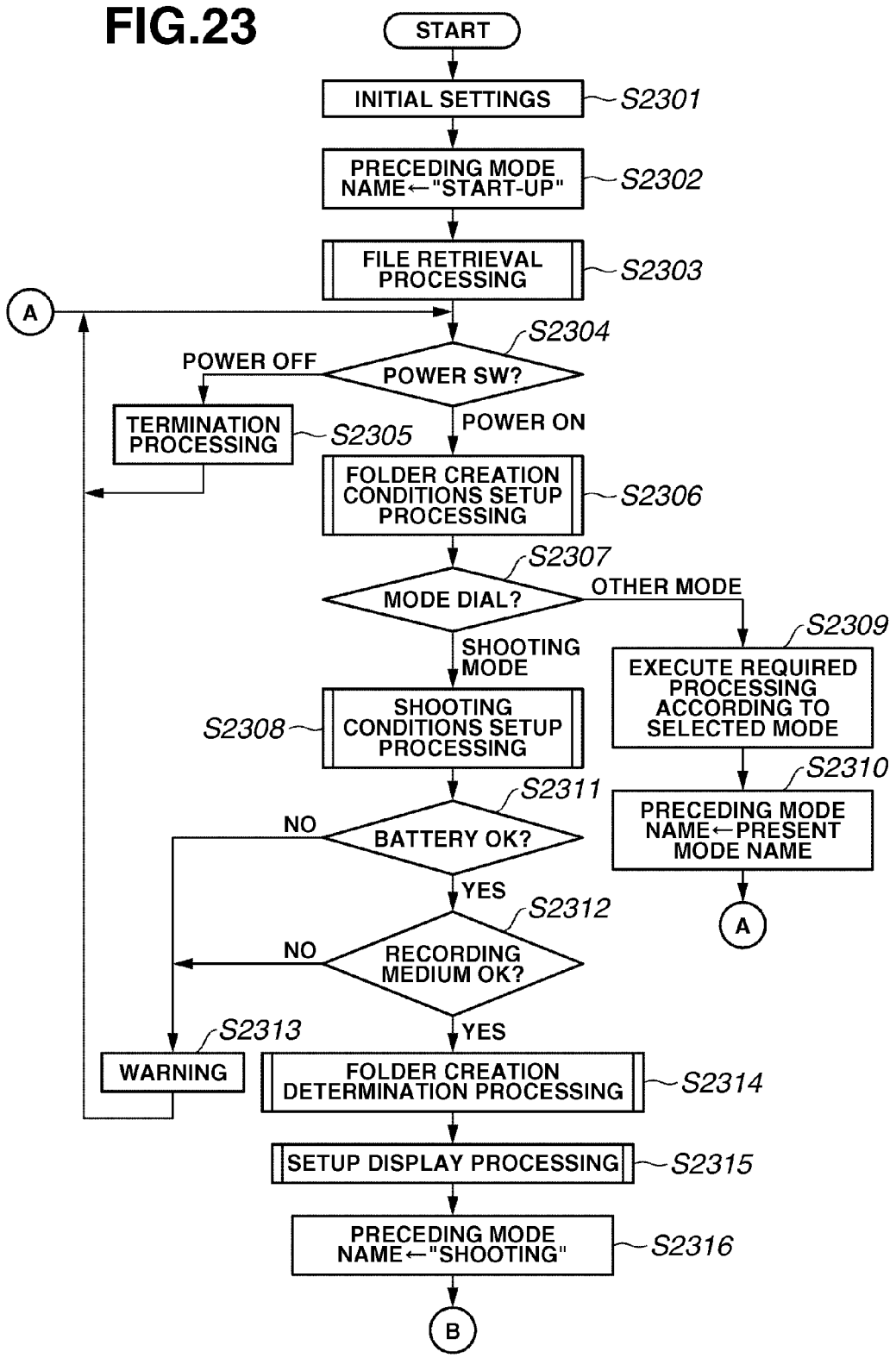
FIG. 23 is a flowchart showing part of the overall operation of the digital camera in accordance with the second exemplary embodiment.

FIG. 16 is a flowchart showing exemplary details of the setup display processing performed in step S2315 of FIG. 23. First, in step S1601, the system control circuit 50 checks the state of the folder creation flag stored in its internal memory or in the memory 52. When the folder creation flag is released (OFF in step S1601), the system control circuit 50 cancels a folder creation indication on the display section 54 as well as on the image display section 28 (refer to step S1602), and the processing flow proceeds to step S1606.

On the other hand, when the folder creation flag is set to ON, the system control circuit 50 determines whether the preceding mode name stored in its internal memory or in the memory 52 is equal to the present mode name (refer to step S1603). When the preceding mode name is equal to the present mode name, the processing flow proceeds to step S1605. When the preceding mode name is not equal to the present mode name, the processing flow proceeds to step S1604.

In step S1604, the system control circuit 50 causes the display section 54 and the image display section 28 to flicker the folder creation indication for a predetermined time (refer to step S1604).

Figure 17:
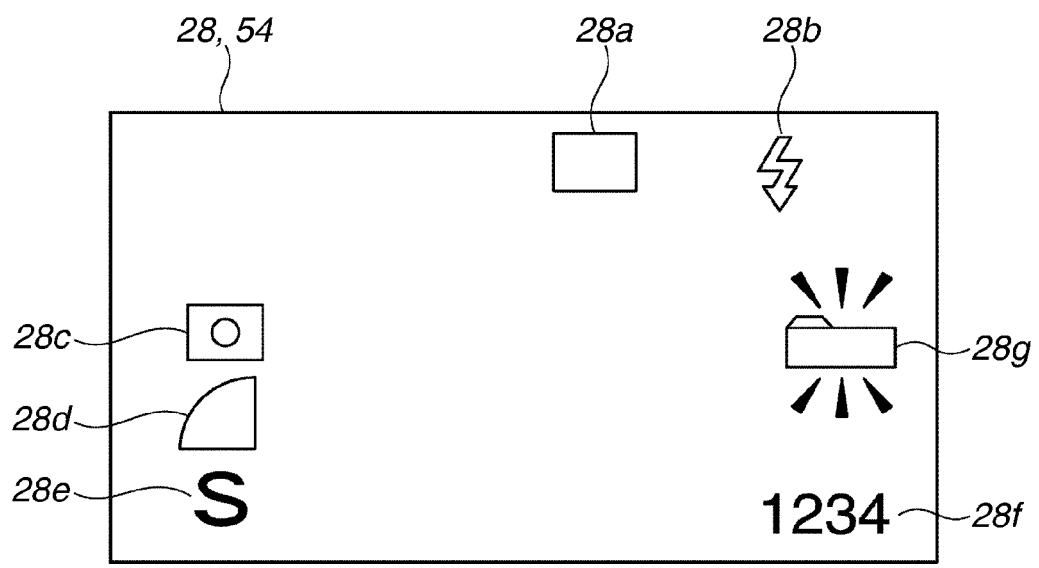
FIG. 17 is a view showing a display example used in the setup display processing performed by the digital camera in accordance with the second exemplary embodiment.

FIG. 17 shows a display example of the display section 54 and the image display section 28 performed in step S1604. In particular, FIG. 17 shows the display screen including various setup states of the digital camera 100 other than the folder creation indication. Here, only the folder creation indication (28g) flickers, while other various setup states of the digital camera 100 remain in an ordinary display condition. These various setup states include the single shot/continuous shot indication (28a), the flash indication (28b), the photometry method indication (28c), the compression rate indication (28d), the recording pixel number indication (28e), and the residual shot number indication (28f).

Flickering only the folder creation indication (28g) and holding other setup indications (28a to 28f) unchanged can highlight the folder creation indication (28g) that can be probably overlooked among other setup indications, during a mode switching operation. Thus, a user can surely know that a folder will be created in the next shooting operation.

In particular, in a start-up operation, the preceding mode name is set to "start-up" in step S2302 of FIG. 23. Then, in the setup display processing just after start-up in step S2315, the preceding mode name is displayed as "start-up" and the present mode name is displayed as "shooting." Thus, even in the start-up operation, the folder creation indication can be flickered and highlighted.

In step S1605, the system control circuit 50 causes the display section 54 and the image display section 28 to display the folder creation indication 28g with images and/or voice. More specifically, the folder creation indication 28g is displayed in an ordinary state. If the folder creation indication 28g is flickered in step S1604, the display condition of the folder creation indication 28g will be turned from the flickering state to an ordinary state.

The display example of the display section 54 and the image display section 28 in step S1605 is similar to the example shown in FIG. 15. Similar to FIG. 17, FIG. 15 shows various setup states of the digital camera 100, although the various setup state indications (28a to 28f), including the folder creation indication, are displayed in an ordinary state.

The system control circuit 50 causes the display section 54 to display (or update) various setup states of the digital camera 100 other than the folder creation flag with images and/or voice (refer to step S1606), and terminates the setup display processing.

As described above, the second exemplary embodiment can highlight (flicker) the folder creation indication that can be probably overlooked among other setup indications, in a start-up or mode switching operation, while other setup indications are unchanged. Thus, a user can surely know that a new folder will be created in the next shooting operation.

Although the present exemplary embodiment can flicker the folder creation indication, it is also possible to change the color or size of the indication as other method for highlighting the indication.

Third Exemplary Embodiment

Next, various operations of the digital camera will be described with reference to FIGS. 2-3, 5-13, 15, and 18-19, as an example of the image processing apparatus according to a third exemplary embodiment of the present invention.

A digital camera according to the third exemplary embodiment is similar to the digital camera 100 of the first exemplary embodiment in its function arrangement (refer to FIG. 1). In the following description, the digital camera according to the third exemplary embodiment will be denoted by the same reference numeral (i.e., 100).

The operation of the digital camera 100 according to the third exemplary embodiment is similar to the operation of the digital camera 100 according to the first exemplary embodiment, but is differentiated in the folder creation determination processing performed in step S112 and the setup display processing performed in step S113 of FIG. 2. In the following description, characteristic features of the third exemplary embodiment will be described.

The present exemplary embodiment is characterized in the folder creation determination processing performed in step S112 of FIG. 2. More specifically, when the folder creation flag is set in step S907 of FIG. 9, the system control circuit 50 stores the information relating to the conditions satisfied for setting the flag. For example, the system control circuit 50 stores, in its internal memory or in the memory 52, the information identifying the forced creation request, the date/time creation determination, or the combination image creation determination as the conditions satisfied for setting the flag. In this case, the folder creation flag can include the information relating to the setting factor.

Figure 18:
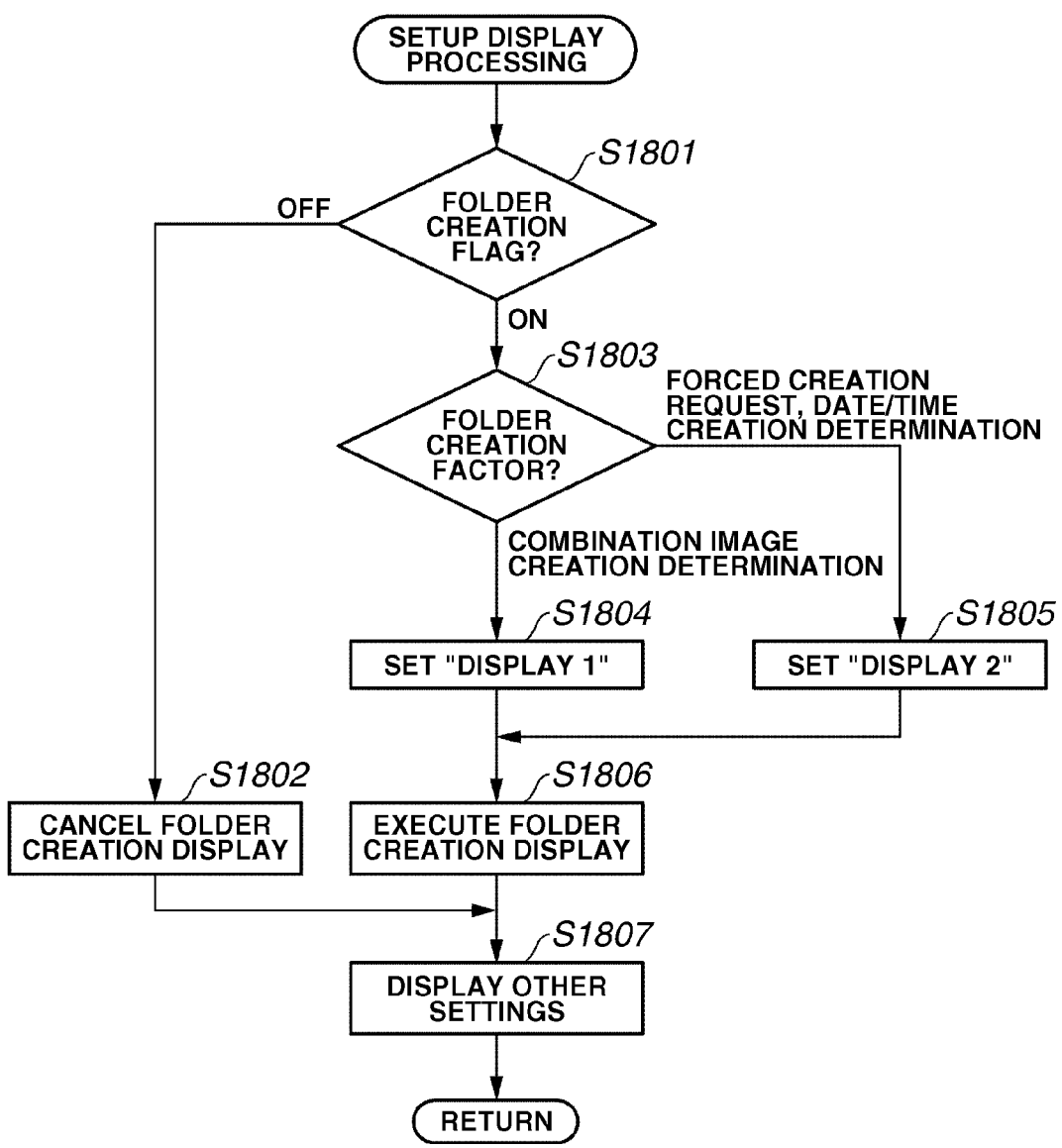
FIG. 18 is a flowchart showing details of setup display processing performed by a digital camera in accordance with a third exemplary embodiment.

FIG. 18 is a flowchart showing exemplary details of the setup display processing that the digital camera 100 of the present exemplary embodiment executes in step S113 of FIG. 2. First, the system control circuit 50 checks the state of the folder creation flag stored in its internal memory or in the memory 52 (refer to step S1801). When the folder creation flag is released (OFF in step S1801), the system control circuit 50 causes the display section 54 and the image display section 28 to cancel the folder creation indication (refer to step S1802), and the processing flow proceeds to step S1807.

On the other hand, when the folder creation flag is set (ON in step S1801), the system control circuit 50 checks a folder creation factor with reference to the information stored in its internal memory or in the memory 52 (refer to step S1803).

When the folder creation factor is derived from establishment of creation conditions in the combination image creation determination, the system control circuit 50 sets "display 1" as a folder creation indication format (refer to step S1804). For example, the folder creation indication format "display 1" includes turning a folder icon into gray. When the folder icon is gray, a user cannot stop the folder creation.

On the other hand, when the folder creation factor is derived from user's forced creation request or establishment of creation conditions in the date/time creation determination, the system control circuit 50 sets "display 2" as the folder creation indication format (refer to step S1805). For example, the folder creation indication format "display 2" includes holding the folder icon in an ordinary display state. In anyway, the folder creation indication format "display 2" should be differentiated from the folder creation indication format "display 1."

Then, the system control circuit 50 causes the display section 54 and the image display section 28 to display the folder creation indication with images and/or voice (refer to step S1806). In this case, the folder creation indication is displayed according to the display format being set in step S1804 or in step S1805.

When the folder creation indication format "display 2" including an ordinary display of the folder icon is selected (refer to step S1805), the display example of the display section 54 and the image display section 28 in step S1806 is similar to FIG. 15. In this case, FIG. 15 displays also various setup states of the digital camera 100 other than the folder creation indication. FIG. 15 is a display example used when a new folder is created based on user's settings. Thus, a user can arbitrarily set folder creation conditions if necessary and can stop creation of a new folder.

Figure 19:
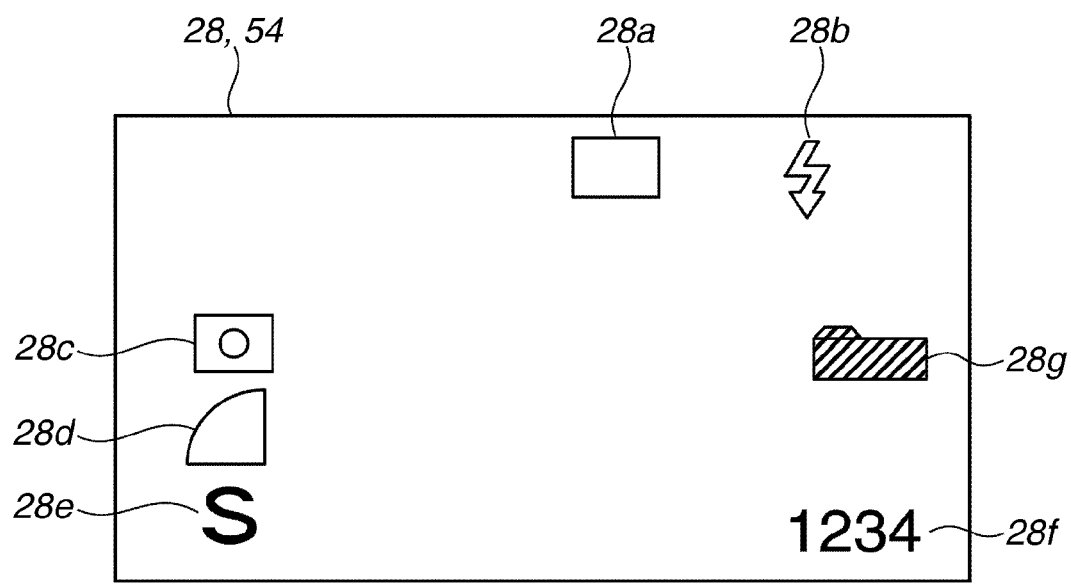
FIG. 19 is a view showing a display example used in the setup display processing performed by the digital camera in accordance with the third exemplary embodiment.

On the other hand, FIG. 19 shows a display example of the display section 54 and the image display section 28 used in step S1806 when the folder creation indication format "display 1" is set in step S1804. Similar to FIG. 15, FIG. 19 shows also various setup states (28a to 28f) of the digital camera 100, although the folder icon (28g) is turned into gray.

FIG. 19 is a display example used when a folder is forcibly created by the camera, for a recordable image number per folder. When the folder icon is gray, a user cannot stop creation of a new folder. The system control circuit 50 causes the display section 54 to display (or update) various setup states of the digital camera 100 other than the folder creation indication with images and/or voice (refer to step S1807), and terminates the setup display processing.

As described above, the present exemplary embodiment changes the display format of the folder creation indication with reference to the folder creation factor. Therefore, the digital camera 100 can not only notify the state that a new folder will be created in the next shooting but also can notify whether a user can stop the creation of a new folder.

For example, in the condition that the creation of a new folder cannot be stopped, a user may uselessly operate a menu screen and its hierarchy screens to cancel folder creation settings. The present exemplary embodiment can eliminate such useless operations.

Fourth Exemplary Embodiment

Next, various operations of the digital camera will be described with reference to FIGS. 2-3, 5 through 13, 20-21, and 22, as an example of the image processing apparatus according to a fourth exemplary embodiment of the present invention.

A digital camera according to the fourth exemplary embodiment is similar to the digital camera 100 of the first exemplary embodiment in its function arrangement (refer to FIG. 1). In the following description, the digital camera according to the fourth exemplary embodiment will be denoted by the same reference numeral (i.e., 100).

The operation of the digital camera 100 according to the fourth exemplary embodiment is similar to the operation of the digital camera 100 according to the first exemplary embodiment, but is differentiated in the setup display processing performed in step S113 of FIG. 2. In the following description, characteristic features of the fourth exemplary embodiment will be described.

Figure 20:
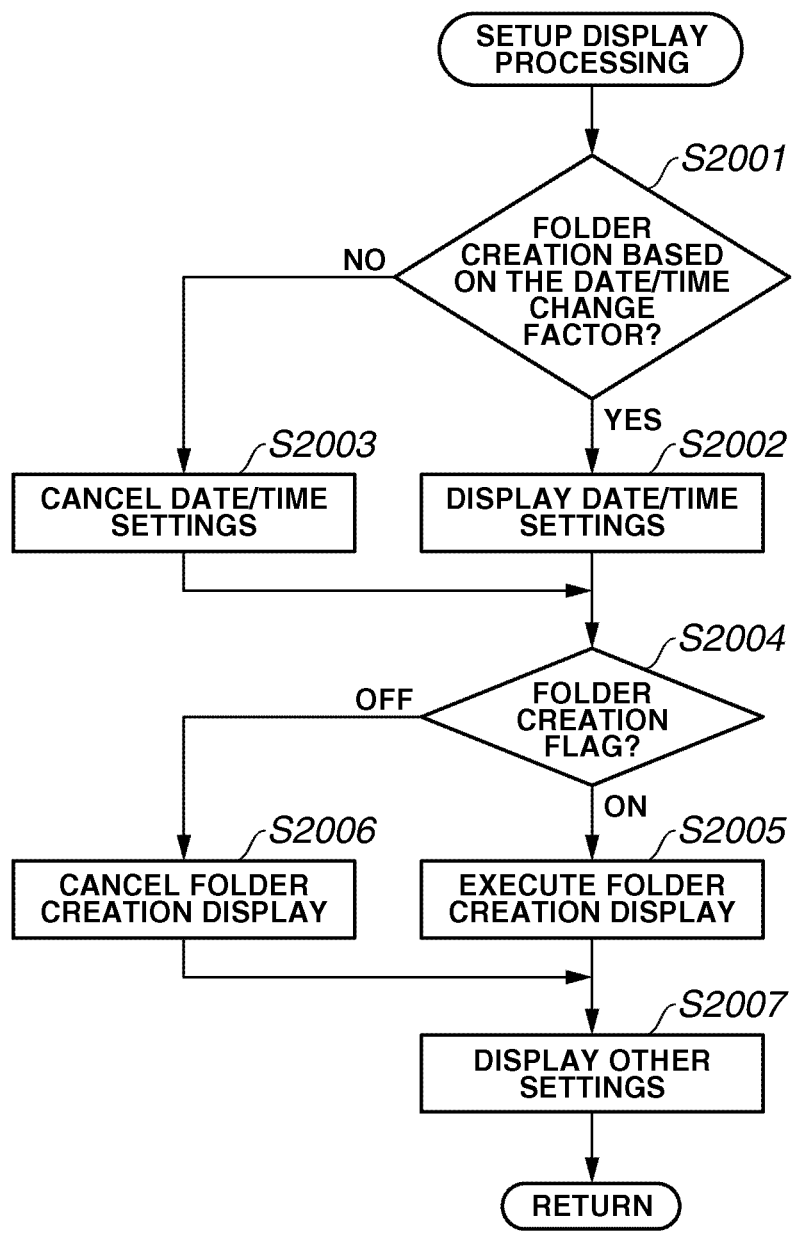
FIG. 20 is a flowchart showing details of setup display processing performed by a digital camera in accordance with a fourth exemplary embodiment.

FIG. 20 is a flowchart showing details of the setup display processing that the digital camera 100 of the present exemplary embodiment executes in step S113 of FIG. 2. First, the system control circuit 50 determines whether the folder creation based on the date/time change factor is set (refer to step S2001).

When the folder creation based on the date/time change factor is set (refer to step S2001), the system control circuit 50 causes the display section 54 and the image display section 28 to display the date/time change factor, i.e., folder creation conditions (refer to step S2002), and the processing flow proceeds to step S2004.

Figure 21:
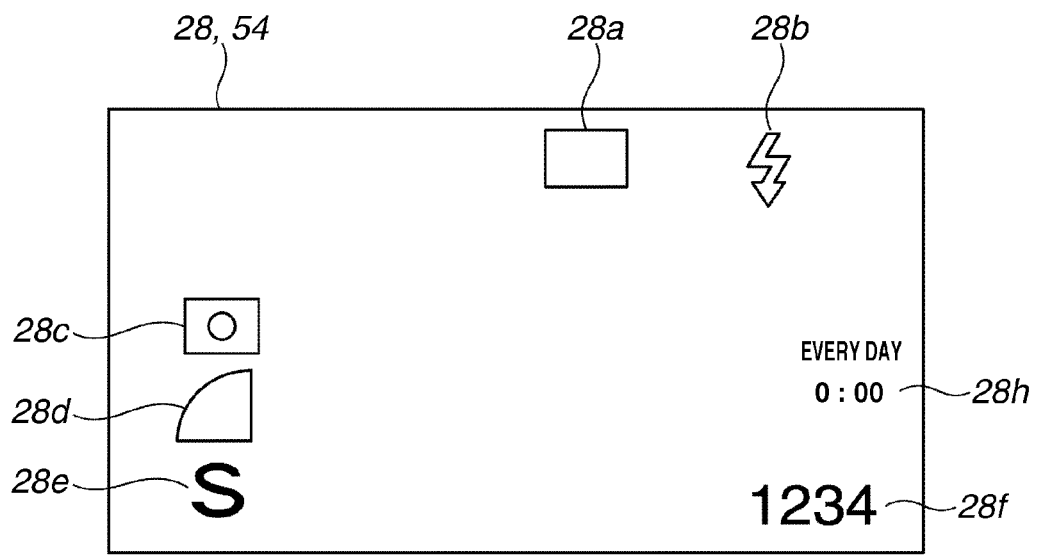
FIG. 21 is a view showing a display example used in the setup display processing performed by the digital camera in accordance with the fourth exemplary embodiment.

FIG. 21 shows a display example of the display section 54 and the image display section 28 used in the processing of step S2002. FIG. 21 shows a state that the folder creation flag is released (more specifically, different from the reservation date/time of the folder creation). FIG. 21 shows various setup states of the digital camera 100 other than the folder creation indication.

According to the example shown in FIG. 21, not only the various setup states (28a to 28f) of the digital camera 100 are displayed but also a date/time change factor 28h (i.e., date settings: "every day 0:00") is displayed as the folder creation conditions. Displaying the folder creation conditions in this manner enables a user to confirm that the folder creation conditions are accurately set before a new folder is actually created. Thus, the present exemplary embodiment can reduce setting errors and provide reliable display When the folder creation based on a date/time change factor is not set in step S2001 (No in step S2001), the system control circuit 50 causes the display section 54 and the image display section 28 to cancel the date/time display (refer to step S2003), and the processing flow proceeds to step S2004.

In step S2004, the system control circuit 50 checks the state of the folder creation flag stored in its internal memory or in the memory 52. When the folder creation flag is set (ON in step S2004), the system control circuit 50 causes the display section 54 and the image display section 28 to display the folder creation indication (refer to step S2005), and the processing flow proceeds to step S2007.

Figure 22:
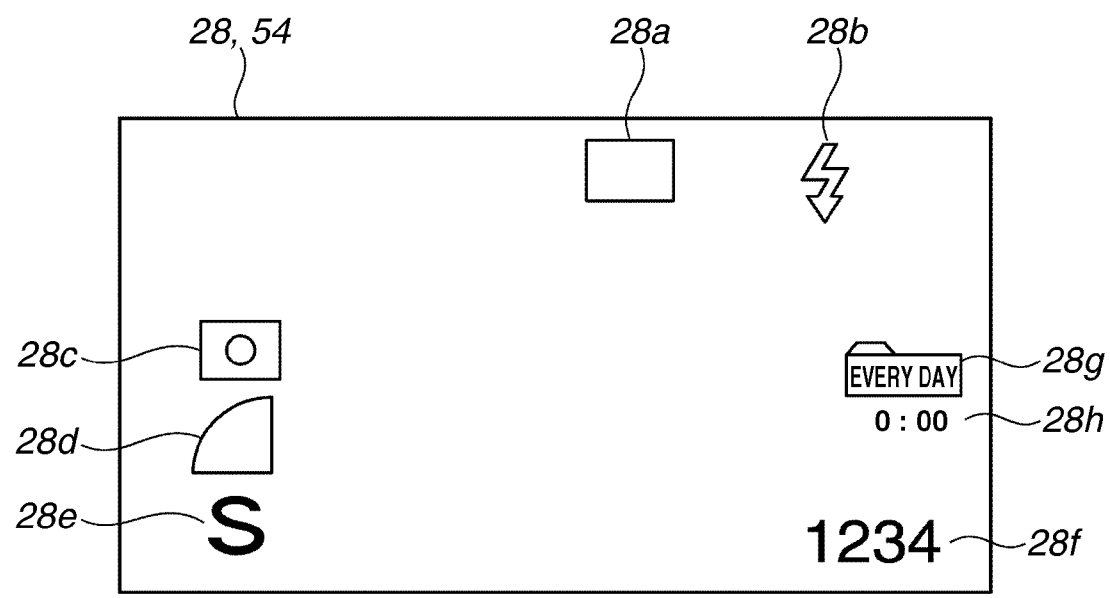
FIG. 22 is a view showing a display example used in the setup display processing performed by the digital camera in accordance with the fourth exemplary embodiment.

FIG. 22 shows a display example of the display section 54 and the image display section 28 used in the processing of step S2005. According to the example of FIG. 22, folder creation based on the date/time change factor is set and various setup states of the digital camera 100 other than the folder creation indication are displayed.

As understood from the drawings, the display example of FIG. 22 includes a date/time change factor setup indication (28*h*) as the folder creation conditions, various setup states (28*a* to 28*f*) of the digital camera 100, and the folder creation indication (28*g*). Accordingly, when the folder creation conditions are accurately set, a user can confirm that a folder will be newly created in the next shooting operation.

When the folder creation flag is released in step S2004 (OFF in step S2004), the system control circuit 50 causes the display section 54 and the image display section 28 to cancel the folder creation indication (refer to step S2006), and the processing flow proceeds to step S2007. In step S2007, the system control circuit 50 causes the display section 54 to display (update) various setup states of the digital camera 100 other than the folder creation flag with images and/or voice, and terminates the setup display processing.

As described above, the present exemplary embodiment displays the setting contents (folder creation conditions) when the folder creation based on a date/time change factor is set. Therefore, before a new folder is actually created, a user can confirm whether the folder creation conditions are accurately set. Thus, the present exemplary embodiment can reduce setting errors and provide reliable display.

Other Exemplary Embodiments

According to the display examples of the above-described exemplary embodiments, the folder creation indication 28*g* is a folder icon. However, it is possible to use letters or other type of indication. Furthermore, in addition to the indication (such as an icon), or instead of using the indication, it is possible to generate a voice message. Furthermore, any other type of method can be employed if this method enables a user to know creation of a new folder in the next shooting operation.

When the image processing apparatus is not equipped with a display device capable of displaying an icon or letters, or when the display section is in an unavailable or disabled state, any other method can be used. For example, the folder creation indication can be a simple display element, such as LED, or can be a voice message. In particular, a digital single lens reflex camera cannot display through images. In such a case, an LED or a voice message can be used to notify the information instead of using the display section.

A user may prefer the display section not to display various state indications (for example, 28*a* through 28*f* of FIG. 15) of the digital camera 100 other than the folder creation indication. Even in such a case, it is possible to forcibly display only the folder creation indication (for example, 28*g* of FIG. 15), so that a user can surely know the creation of a new folder.

This arrangement enables a user to easily perceive the folder creation indication even in a start-up or mode switching operation, and can reduce the necessity of a flickering or highlight display described in the second exemplary embodiment.

Furthermore, the above-described exemplary embodiments are based on shooting of still images. However, the shooting mode in step S106 of FIG. 2 can be a movie mode other than a still image mode. In this case, the system control section 50 can execute the folder creation determination processing and the setup display processing prior to a movie shooting operation. A shooting movie can be stored in a newly created folder, and the folder creation indication can be canceled. Thus, similar effects can be obtained in the movie shooting operation.

In general, the movie shooting operation takes a long time. However, the folder creation indication can be displayed for a sufficient time until captured images can be completely stored in an actually created folder. Accordingly, the folder creation indication can be continuously displayed during the movie shooting operation.

The recording medium 200 and 210 can be a memory card such as PCMCIA card or compact flash (registered trademark), or a hard disk, or can be constituted by a micro DAT, an optical magnetic disk, a CD-R, a CD-RW, or comparable optical disk, or a DVD or comparable phase-change type optical disk.

Furthermore, the recording medium 200 and 210 can be a complex medium that integrates a memory card and a hard disk. Furthermore, the complex medium can include a portion partly attachable or detachable.

Furthermore, in the above-described exemplary embodiments, the recording medium 200 and 210 is detachable from the digital camera 100 and arbitrarily connectable to the digital camera 100. However, part or all of the recording media can be fixed to the digital camera 100.

Furthermore, an arbitrary number of (i.e., single or plural) recording media can be connected to the digital camera 100. In the above-described exemplary embodiments, any combination of recording media (200 and 210) can be attached to the digital camera 100.

Further, it is noted that the present invention can be applied to a system including plural devices or to a single device.

Furthermore, to accomplish the purpose of the present invention, software program codes for realizing the functions of the above-described exemplary embodiments can be supplied, via a storage medium (or a recording medium), to a system or an apparatus. A computer (or CPU or MPU) in the system or the apparatus can read the program codes stored in the storage medium and can execute the readout program(s).

In this case, the program codes read out from the storage medium can realize the functions of the exemplary embodiments. The equivalents of program(s) can be used if they possess comparable functions. Accordingly, when the functions or processes of the present invention are realized by a computer, program codes installed in the computer and a recording medium storing the programs are also means for realizing the present invention.

In other words, the present invention encompasses the computer program(s) that can realize the functions or processes of the present invention or any recording medium that can store the program(s). In this case, the type of program(s) can be selected from any one of object codes, interpreter programs, and OS script data.

A recording medium supplying the program(s) can be selected from any one of flexible disk, hard disk, optical disk, magneto-optical disk, MO, CD-ROM, CD-R, CD-RW, magnetic tape, nonvolatile memory card, ROM, and DVD (DVD-ROM, DVD-R).

The method for supplying the program(s) includes accessing a home page on the Internet using the browsing function of a client computer, when the home page allows each user to download the computer programs of the present invention, or compressed files of the programs having automatic installing functions, to a hard disk or other recording medium of the user.

Moreover, the program codes constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Additionally, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, not only the functions of the above-described exemplary embodiments can be realized by a computer that executes the programs, but also an operating system (OS) running on the computer can execute part or all of the actual processing based on instructions of the programs.

Also, the program codes read out of a storage medium can be written into a memory of a feature expansion board equipped in a computer or into a memory of a feature expansion unit connected to the computer. In this case, based on an instruction of the program, a CPU provided on the feature expansion board or the feature expansion unit can execute part or all of the processing so that the functions of the above-described exemplary embodiments can be realized. When the present invention is applied to the above-described recording medium, the program codes corresponding to the above-described flowcharts can be stored in the recording medium.

Moreover, claims of the present invention, or at least part of the arrangement of the exemplary embodiments, can constitute a single apparatus or a combined apparatus, or can be constituent components of the apparatus.

As described above, in particular, according to the present invention, the final shooting date/time is determined in the file retrieval processing (refer to FIG. 7) and can be used as the standard date/time information. Then, the final shooting date/time is compared with the present time in the folder creation determination processing (refer to FIG. 9) and in the date creation determination processing (refer to FIG. 10), to execute a new folder creation possibility determination. Therefore, in the folder creation conditions setup processing (refer to FIG. 8), the folder creation conditions can be freely changed before executing a shooting operation.

Additionally, in the file retrieval processing (refer to FIG. 7), the final shooting date/time can be selected between the final shooting date/time of the image processing apparatus and the date/time of a final file in the recording medium. Thus, an optimum final shooting date/time can be determined regardless of replacement of recording media.

Furthermore, recording and holding the final shooting date/time can realize a prompt grouping determination at the start-up of the image processing apparatus. Furthermore, recording and holding the final image date/time during the replacement of recording media or in a shooting operation can minimize the inspection of the recording media. The disagreement between the information stored in the recording medium and actual shooting time information can be eliminated.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An image processing apparatus configured to record an image file obtained by a shooting operation in a recording medium folder in a recording medium, the image processing apparatus comprising:
   a user interface configured to allow a user to set units of date/time for use in automatically creating a new folder for storing image files;
   a first recording unit configured to record the units of date/time set via the user interface;
   a second recording unit configured to record date/time of a last shooting operation;
   a selecting unit configured to compare the date/time of the last shooting operation recorded in the second recording unit and a date/time of an image file which is lastly shot among image files existing in the recording medium folder, and designate, as a final shooting date/time, that date/time which is older between the date/time of the last shooting operation recorded in the second recording unit and the date/time of the image file which is lastly shot among image files existing in the recording medium folder;
   a folder creation unit configured to compare a date/time of a shooting operation with the final shooting date/time designated by the selecting unit to determine whether to create a new folder in the recording medium; and
   a third recording unit configured to record an image file in an existing folder in the recording medium, wherein,
   in response to the folder creation unit determining to create a new folder in the recording medium, the folder creation unit automatically creates the new folder in the recording medium, the new folder corresponding to the set units of date/time recorded in the first recording unit, and the third recording unit records the image file obtained by the shooting operation in the new folder in the recording medium created by the folder creation unit as an existing folder in the recording medium, and
   in response to the folder creation unit determining not to create a new folder in the recording medium, the folder creation unit refrains from automatically creating a new folder in the recording medium but the third recording unit records the image file obtained by the shooting operation in an existing folder in the recording medium.

2. The image processing apparatus according to claim 1, further comprising a setting unit configured to allow the user to set a forced creation instruction of a new folder, wherein the folder creation unit creates a new folder upon a next shooting operation in response to the set forced creation instruction.

3. The image processing apparatus according to claim 2, wherein the setting unit is the user interface.

4. The image processing apparatus according to claim 1, wherein the units of date/time are one of time, date, week, month, and year.

5. The image processing apparatus according to claim 4, wherein, in response to determining a change in a value of the units of date/time, an offset time to shift a standard time can be set via the user interface.

6. The image processing apparatus according to claim 1, wherein at least one of date/time recorded in the second recording unit and a latest date/time of captured image file that exists in the recording medium is updated at one of a timing in response to exchanging the recording medium and shooting the image file.

7. The image processing apparatus according to claim 1, wherein the recording medium is installed into the image processing apparatus after the date/time of the last shooting operation recorded in the second recording unit.

8. The image processing apparatus according to claim 7, wherein the recording medium is a second recording medium that is exchanged into the image processing apparatus to replace a first recording medium after the date/time of the last shooting operation recorded in the second recording unit.

9. A method for an image processing apparatus to record an image file obtained by a shooting operation in a recording medium folder in a recording medium, the method comprising:

allowing a user to set units of date/time for use in automatically creating a new folder for storing image files;

recording the units of date/time set;

recording date/time of a last shooting operation;

comparing the recorded date/time of the last shooting operation and a date/time of an image file which is lastly shot among image files existing in the recording medium folder, and designating, as a final shooting date/time, that date/time which is older between the recorded date/time of the last shooting operation and the date/time of the image file which is lastly shot among image files existing in the recording medium folder; and comparing a date/time of a shooting operation with the designated final shooting date/time to determine whether to create a new folder in the recording medium, wherein, in response determining to create a new folder in the recording medium, automatically creating the new folder in the recording medium, the new folder corresponding to the recorded set units of date/time, and recording the image file obtained by the shooting operation in the new folder in the recording medium as an existing folder in the recording medium, and in response to determining not to create a new folder in the recording medium, refraining from automatically creating a new folder in the recording medium but recording the image file obtained by the shooting operation in an existing folder in the recording medium.

10. The method according to claim 9, further comprising allowing the user to set a forced creation instruction of a new folder, wherein creating a new folder includes creating a new folder upon a next shooting operation in response to the set forced creation instruction.

11. The method according to claim 9, wherein the units of date/time are one of time, date, week, month, and year.

12. The method according to claim 11, wherein, in response to determining a change in a value of the units of date/time, an offset time to shift a standard time can be set.

13. The method according to claim 9, wherein at least one of recorded date/time and a latest date/time of captured image file that exists in the recording medium is updated at one of a timing in response to exchanging the recording medium and shooting the image file.

14. A non-transitory computer-readable storage medium storing a program causing an image processing apparatus to perform the method according to claim 9.

15. The method according to claim 9, wherein the recording medium is installed into the image processing apparatus after the date/time of the recorded last shooting operation.

16. The method according to claim 15, wherein the recording medium is a second recording medium that is exchanged into the image processing apparatus to replace a first recording medium after the date/time of the recorded last shooting operation.

\* \* \* \* \*